United States Patent
Wyble et al.

(10) Patent No.: US 11,995,578 B2
(45) Date of Patent: May 28, 2024

(54) METHOD FOR RENDERING OF AUGMENTED REALITY CONTENT IN COMBINATION WITH EXTERNAL DISPLAY

(71) Applicant: InterDigital VC Holdings, Inc., Wilmington, DE (US)

(72) Inventors: David Wyble, Webster, NY (US); Louis Kerofsky, San Diego, CA (US); Ralph Neff, San Diego, CA (US)

(73) Assignee: InterDigital VC Holdings, Inc., Wilmington, DE (US)

( * ) Notice: Subject to any disclaimer, the term of this patent is extended or adjusted under 35 U.S.C. 154(b) by 0 days.

(21) Appl. No.: 18/213,117

(22) Filed: Jun. 22, 2023

(65) Prior Publication Data
US 2023/0419196 A1 Dec. 28, 2023

Related U.S. Application Data

(63) Continuation of application No. 17/606,625, filed as application No. PCT/US2020/034335 on May 22, 2020, now Pat. No. 11,727,321.
(Continued)

(51) Int. Cl.
*G06V 20/20* (2022.01)
*G02B 27/01* (2006.01)
(Continued)

(52) U.S. Cl.
CPC ......... *G06Q 10/04* (2013.01); *G02B 27/0101* (2013.01); *G02B 27/0172* (2013.01);
(Continued)

(58) Field of Classification Search
CPC ............ G02B 27/0101; G02B 27/0172; G02B 2027/0118; G02B 2027/0138;
(Continued)

(56) References Cited

U.S. PATENT DOCUMENTS 10,872,582 B2    12/2020  Wyble
11,727,321 B2 *   8/2023  Wyble ................. G06F 18/2415
                                                         345/633
(Continued)

FOREIGN PATENT DOCUMENTS

WO    2018148076        8/2018
WO    2019046334 A1     3/2019

OTHER PUBLICATIONS

Li, Tianxing, et al., "Real-Time Screen-Camera Communication Behind Any Scene." Proceedings of the 13th Annual International Conference on Mobile Systems, Applications, and Services, May 18-22, 2015, pp. 197-211.
(Continued)

Primary Examiner — Jeffery A Brier
(74) Attorney, Agent, or Firm — Klintworth & Rozenblat IP LLP

(57) ABSTRACT

Systems and methods are described for improved color rendering. In some embodiments, video is captured of a real-world scene, and a region of screen content is detected in the captured video. A processor selectively applies a screen-content color transformation on the region of screen content to generate processed video, and the processed video is displayed substantially in real time, for example on a video-see-through head-mounted display. The screen-content color processing may be different for different types of external displays. The screen-content color processing may also be determined based at least in part on illumination conditions. In some embodiments, the color of displayed virtual objects is adjusted based on visual parameters of the screen content.

20 Claims, 11 Drawing Sheets

Related U.S. Application Data

(60) Provisional application No. 62/851,476, filed on May 22, 2019.

(51) Int. Cl.
| | | |
|---|---|---|
| *G06F 16/2457* | (2019.01) | |
| *G06F 17/18* | (2006.01) | |
| *G06F 18/21* | (2023.01) | |
| *G06F 18/2113* | (2023.01) | |
| *G06N 20/00* | (2019.01) | |
| *G06N 20/20* | (2019.01) | |
| *G06Q 10/04* | (2023.01) | |
| *G06T 19/00* | (2011.01) | |
| *G09G 3/00* | (2006.01) | |

(52) U.S. Cl.
CPC ........ *G06F 16/24578* (2019.01); *G06F 17/18* (2013.01); *G06F 18/2113* (2023.01); *G06F 18/2193* (2023.01); *G06N 20/00* (2019.01); *G06N 20/20* (2019.01); *G06T 19/006* (2013.01); *G06V 20/20* (2022.01); *G09G 3/003* (2013.01); *G02B 2027/0118* (2013.01); *G02B 2027/0138* (2013.01); *G02B 2027/014* (2013.01); *G09G 2320/0626* (2013.01)

(58) Field of Classification Search
CPC .............. G02B 2027/014; G06T 19/006; G06V 20/20; G09G 3/003; G09G 2320/0626; G06Q 10/04; G06Q 30/02; G06Q 40/00; G06F 16/24578; G06F 17/18; G06F 18/2113; G06F 18/2193; G06F 18/2415; G06N 20/00; G06N 20/20; G06N 7/01
See application file for complete search history.

(56) References Cited

U.S. PATENT DOCUMENTS

| | | |
|---|---|---|
| 2012/0127284 A1 | 5/2012 | Bar-Zeev |
| 2012/0237085 A1 | 9/2012 | Meier |
| 2013/0063486 A1 | 3/2013 | Braun |
| 2013/0147826 A1 | 6/2013 | Lamb |
| 2014/0132484 A1 | 5/2014 | Pandey |
| 2014/0132629 A1 | 5/2014 | Pandey |
| 2015/0070388 A1 | 3/2015 | Sheaffer |
| 2015/0309705 A1 | 10/2015 | Keeler |
| 2016/0014350 A1 | 1/2016 | Osman |
| 2016/0217623 A1 | 7/2016 | Singh |
| 2017/0131964 A1 | 5/2017 | Baek |
| 2020/0202161 A1 | 6/2020 | Kondo |

OTHER PUBLICATIONS

International Preliminary Report on Patentability for PCT/US2020/034335 dated Nov. 16, 2021.
Kerofsky, L., et al., "Improving content visibility for high-ambient-illumination viewable display and energy-saving display." Journal of the Society for Information Display 19.9, 2011, pp. 645-654 (10 pages).
International Telecommunication Union, "Parameter Values for The HDTV Standards for Production and International Programme Exchange". BT Series Broadcasting Service, Recommendation ITU-R BT.709-5, Apr. 2002, 32 pages.
International Telecommunication Union, "Parameter Values For Ultra-High Definition Television Systems For Production And International Programme Exchange". BT Series Broadcasting Service, Recommendation ITU-R BT.2020, Aug. 2012, 7 pages.
Klein, G. "Visual tracking for augmented reality." PhD dissertation, University of Cambridge, 2006 (193 pages).
Rodrigue, M., et al., "Mixed reality simulation with physical mobile display devices." In 2015 IEEE Virtual Reality (VR), IEEE, 2015 (6 pages).
Shuo, Y., et al., "A Design of Augmented Reality System based on Real-World Illumination Environment for Edutainment." Indian Journal of Science and Technology vol. 8, No. 25. Oct. 2015 (6 pages).
Cobzas, D., et al., "Editing Real World Scenes: Augmented Reality with Image-based Rendering." In Proceedings of the IEEE Virtual Reality, 2003 (2 pages).
Fradet, M., et al., "[poster] mr TV mozaik: A new mixed reality interactive TV experience." In 2017 IEEE International Symposium on Mixed and Augmented Reality (ISMAR-Adjunct), IEEE, 2017, (5 pages).
Alizadeh, P., "Object Distance Measurement Using A Single Camera For Robotic Applications" Doctoral dissertation, Laurentian University of Sudbury, 2015 (126 pages).
Wüller, D., et al., "The usage of digital cameras as luminance meters." In Digital Photography III, vol. 6502, SPIE, 2007, (11 pages).
Wikipedia, "sRGB" as of Jan. 6, 2019, retrieved from https://web.archive.org/web/20190106182517/https://en.wikipedia.org/wiki/SRGB.
Ebner, M. Color constancy. vol. 7. Chichester, West Sussex: John Wiley & Sons, 2007, (408 pages).
Ebner, M., "The Gray World Assumption." Color Constancy, Chapter 6 section 2, Chichester, West Sussex: John Wiley & Sons, 2007 pp. 121-128 (8 pages).
Sample Matlab code for Gray World Assumption algorithm as of Sep. 25, 2018, retrieved from https://web.archive.org/web/20180925215126/http://www.mathworks.com/help/images/ref/illumgray.html.
Finlayson, G.D. et al., "Performance Of A Chromatic Adaptation Transform Based On Spectral Sharpening". In Color and Imaging Conference, vol. 2000, No. 1, Society for Imaging Science and Technology, 2000 (7 pages).
Fairchild, M., et al., "Colorimetric Characterization Of The Apple Studio Display (Flat Panel LCD)" Jul. 1998, (26 pages).
Display Specifications 64.5 TCL 65X10 Europe—Specifications, last accessed on Aug. 30, 2022, https://www.displayspecifications.com/en/model/65791c30 (10 pages).
Nacenta, M., "Computer Vision Approaches To Solve The Screen Pose Acquisition Problem For Perspective Cursor" Technical Report HCI-TR-06-01, Computer Science Dept., University of Saskatchewan, Dec. 2006 (8 pages).
International Search Report and Written Opinion for PCT/US20/34335 dated Aug. 10, 2020.
www.brucelindbloom.com"Chromatic Adaptation" Web Archive dated Sep. 25, 2018 at: https://web.archive.org/web/20180920153211/http://www.brucelindbloom.com/index.html?Eqn_ChromAdapt.html (19 pages).
www.mathworks.com "chromadapt" Web Archived dated Sep. 25, 2018 at https://web.archive.org/web/20180925215843/https://www.mathworks.com/help/images/ref/chromadapt.html (7 pages).

\* cited by examiner

METHOD FOR RENDERING OF AUGMENTED REALITY CONTENT IN COMBINATION WITH EXTERNAL DISPLAY

CROSS-REFERENCE TO RELATED APPLICATIONS

The present application is a continuation of U.S. patent application Ser. No. 17/606,625, filed Oct. 26, 2021, which is a national stage application under 35 U.S.C. § 371 of International Application No. PCT/US2020/034335, entitled "Method for Rendering of Augmented Reality Content in Combination with External Display," filed on May 22, 2020, which claims benefit under 35 U.S.C. § 119(e) from U.S. Provisional Patent Application No. 62/851,476, entitled "Method for Improved Rendering of Remote Display for Viewing on Local Display," filed May 22, 2019, which is hereby incorporated by reference in its entirety.

BACKGROUND

Augmented reality (AR) and mixed reality (MR) displays, such as head-mounted displays (HMDs), provide the ability to display virtual content alongside a live view of the real world. In the case of optical-see-through displays, the user views the real world though the optics of the display.

Video-see-through augmented reality and mixed reality displays capture video of the real-world environment and display that video to the user in real time. Such displays are generally intended to provide a realistic reproduction of the real-world environment, where the real-world environment may itself include other display devices, such as television or computer screens. Accurate color reproduction contributes to the desired level of realism. Such displays also allow for virtual objects to be displayed such that the virtual objects or other virtual content appear to the user to be integrated with (or even a part of) the real world. Accurate color reproduction of virtual objects contributes to the satisfactory integration of those objects with the real-world.

SUMMARY

In some embodiments, a method includes: capturing at least one image of a real-world scene; identifying, in the at least one image, a captured region of screen content; determining at least one visual parameter of the screen content from the captured region of screen content; based on the at least one visual parameter, determining a transformation for virtual content; applying the transformation to the virtual content; and causing display of the transformed virtual content on an augmented reality display.

In some embodiments, the at least one visual parameter includes a luminance of the screen content, and the transformation includes a transformation of brightness of the virtual content. The determined luminance of the screen content may be a maximum luminance in the captured region of screen content. The transformation may include a gain factor applied to color code values of the virtual content, wherein the gain factor increases for increased determined luminance of the captured region of screen content.

In some embodiments, the at least one visual parameter includes a white point of the screen content, and the transformation includes a transformation of a white point of the virtual content. The determination of the white point of the screen content may include applying a grey world algorithm to the captured region of screen content.

In some embodiments, the image of the real-world scene is captured using a forward-facing camera of the augmented reality display. The augmented reality display may be an optical-see-through head-mounted display.

In some embodiments, the method further includes using the captured region of screen content, identifying content displayed in the captured regions of screen content; and selecting the virtual content based on the identified content.

In some embodiments, the method further includes: identifying a type of display used to display the screen content; determining at least one further visual parameter based on the type of display, and further transforming the virtual content based on the further visual parameter.

Some embodiments include an apparatus comprising a processor configured to perform the methods described herein. The apparatus may include a non-transitory computer-readable medium storing instructions operative to perform the functions described herein.

EXAMPLE DEVICES FOR IMPLEMENTATION OF THE EMBODIMENTS

Figure 1:
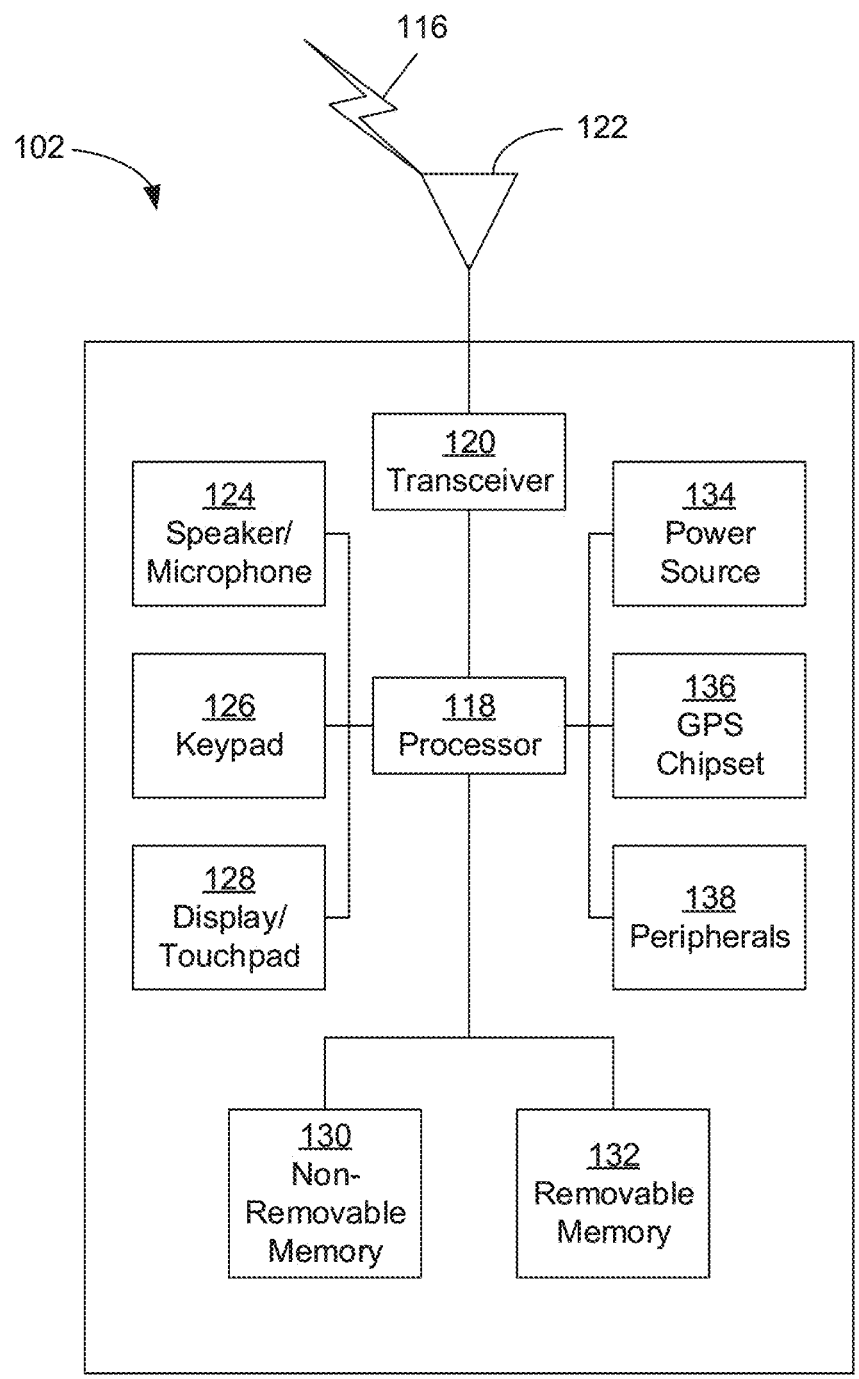
FIG. 1 is a system diagram illustrating an example wireless transmit/receive unit (WTRU) that may be used as a client device in some embodiments.

FIG. 1 is a system diagram illustrating an example wireless transmit/receive unit (WTRU) 102. As shown in FIG. 1, the WTRU 102 may include a processor 118, a transceiver 120, a transmit/receive element 122, a speaker/microphone 124, a keypad 126, a display/touchpad 128, non-removable memory 130, removable memory 132, a power source 134, a global positioning system (GPS) chipset 136, and/or other peripherals 138, among others. It will be appreciated that the WTRU 102 may include any sub-combination of the foregoing elements while remaining consistent with an embodiment.

The processor 118 may be a general purpose processor, a special purpose processor, a conventional processor, a digital signal processor (DSP), a plurality of microprocessors, one or more microprocessors in association with a DSP core, a controller, a microcontroller, Application Specific Integrated Circuits (ASICs), Field Programmable Gate Arrays (FPGAs) circuits, any other type of integrated circuit (IC), a state machine, and the like. The processor 118 may perform signal coding, data processing, power control, input/output processing, and/or any other functionality that enables the WTRU 102 to operate in a wireless environment. The processor 118 may be coupled to the transceiver 120, which may be coupled to the transmit/receive element 122. While FIG. 1 depicts the processor 118 and the transceiver 120 as separate components, it will be appreciated that the processor 118 and the transceiver 120 may be integrated together in an electronic package or chip.

The transmit/receive element 122 may be configured to transmit signals to, or receive signals from, a base station over the air interface 116. For example, in one embodiment, the transmit/receive element 122 may be an antenna configured to transmit and/or receive RF signals. In an embodiment, the transmit/receive element 122 may be an emitter/detector configured to transmit and/or receive IR, UV, or visible light signals, for example. In yet another embodiment, the transmit/receive element 122 may be configured to transmit and/or receive both RF and light signals. It will be appreciated that the transmit/receive element 122 may be configured to transmit and/or receive any combination of wireless signals.

Although the transmit/receive element 122 is depicted in FIG. 1 as a single element, the WTRU 102 may include any number of transmit/receive elements 122. More specifically, the WTRU 102 may employ MIMO technology. Thus, in one embodiment, the WTRU 102 may include two or more transmit/receive elements 122 (e.g., multiple antennas) for transmitting and receiving wireless signals over the air interface 116.

The transceiver 120 may be configured to modulate the signals that are to be transmitted by the transmit/receive element 122 and to demodulate the signals that are received by the transmit/receive element 122. As noted above, the WTRU 102 may have multi-mode capabilities. Thus, the transceiver 120 may include multiple transceivers for enabling the WTRU 102 to communicate via multiple RATs, such as NR and IEEE 802.11, for example.

The processor 118 of the WTRU 102 may be coupled to, and may receive user input data from, the speaker/microphone 124, the keypad 126, and/or the display/touchpad 128 (e.g., a liquid crystal display (LCD) display unit or organic light-emitting diode (OLED) display unit). The processor 118 may also output user data to the speaker/microphone 124, the keypad 126, and/or the display/touchpad 128. In addition, the processor 118 may access information from, and store data in, any type of suitable memory, such as the non-removable memory 130 and/or the removable memory 132. The non-removable memory 130 may include random-access memory (RAM), read-only memory (ROM), a hard disk, or any other type of memory storage device. The removable memory 132 may include a subscriber identity module (SIM) card, a memory stick, a secure digital (SD) memory card, and the like. In other embodiments, the processor 118 may access information from, and store data in, memory that is not physically located on the WTRU 102, such as on a server or a home computer (not shown).

The processor 118 may receive power from the power source 134, and may be configured to distribute and/or control the power to the other components in the WTRU 102. The power source 134 may be any suitable device for powering the WTRU 102. For example, the power source 134 may include one or more dry cell batteries (e.g., nickel-cadmium (NiCd), nickel-zinc (NiZn), nickel metal hydride (NiMH), lithium-ion (Li-ion), etc.), solar cells, fuel cells, and the like.

The processor 118 may also be coupled to the GPS chipset 136, which may be configured to provide location information (e.g., longitude and latitude) regarding the current location of the WTRU 102. In addition to, or in lieu of, the information from the GPS chipset 136, the WTRU 102 may receive location information over the air interface 116 from a base station (e.g., base stations 114a, 114b) and/or determine its location based on the timing of the signals being received from two or more nearby base stations. It will be appreciated that the WTRU 102 may acquire location information by way of any suitable location-determination method while remaining consistent with an embodiment.

The processor 118 may further be coupled to other peripherals 138, which may include one or more software and/or hardware modules that provide additional features, functionality and/or wired or wireless connectivity. For example, the peripherals 138 may include an accelerometer, an e-compass, a satellite transceiver, a digital camera (for photographs and/or video), a universal serial bus (USB) port, a vibration device, a television transceiver, a hands free headset, a Bluetooth© module, a frequency modulated (FM) radio unit, a digital music player, a media player, a video game player module, an Internet browser, a Virtual Reality and/or Augmented Reality (VR/AR) device, an activity tracker, and the like. The peripherals 138 may include one or more sensors, the sensors may be one or more of a gyroscope, an accelerometer, a hall effect sensor, a magnetometer, an orientation sensor, a proximity sensor, a temperature sensor, a time sensor; a geolocation sensor; an altimeter, a light sensor, a touch sensor, a magnetometer, a barometer, a gesture sensor, a biometric sensor, and/or a humidity sensor.

The WTRU 102 may include a full duplex radio for which transmission and reception of some or all of the signals (e.g., associated with particular subframes for both the UL (e.g., for transmission) and downlink (e.g., for reception) may be concurrent and/or simultaneous. The full duplex radio may include an interference management unit to reduce and or substantially eliminate self-interference via either hardware (e.g., a choke) or signal processing via a processor (e.g., a separate processor (not shown) or via processor 118). In an embodiment, the WTRU 102 may include a half-duplex radio for which transmission and reception of some or all of the signals (e.g., associated with particular subframes for either the UL (e.g., for transmission) or the downlink (e.g., for reception)).

DETAILED DESCRIPTION

Color Reproduction of Real-World Displays.

It is desirable for a color reproduction system to have the ability to capture and display all input relevant to the application. For the case of a video pass-through head mounted display (HMD) or phone/tablet, the field of view of the observer may include a second digital display (termed the "external display" herein), such as a television, a computer monitor, or a movie screen, among other possibilities.

Computer controlled digital displays exhibit different properties than most real-world objects and light sources. Therefore, from a color management perspective, the external display may benefit from different processing than the balance of the real-world scene in the field of view of the observer. This is especially true if the external display contains content that is intended to have consistent coloring, such as logos. Inconsistent display of such content may be readily noticeable to the user and may detract from the viewing experience.

A specific example is used to illustrate the challenges. Consider a video presentation on a conventional television screen which is being watched by a viewer wearing an HMD. An application on the HMD is supplying virtual content (e.g. an animated character) associated with the video. The virtual character is being augmented to the view of the HMD wearer. As a result, the HMD wearer sees the primary video and a virtual character. A problem can arise due to the different color capabilities and settings the television may have and the different color rendering capabilities of the HMD. Without coordination, the video content and the virtual content may not share a similar color. The color difference makes the AR content less than fully integrated with the primary video.

Figure 2:
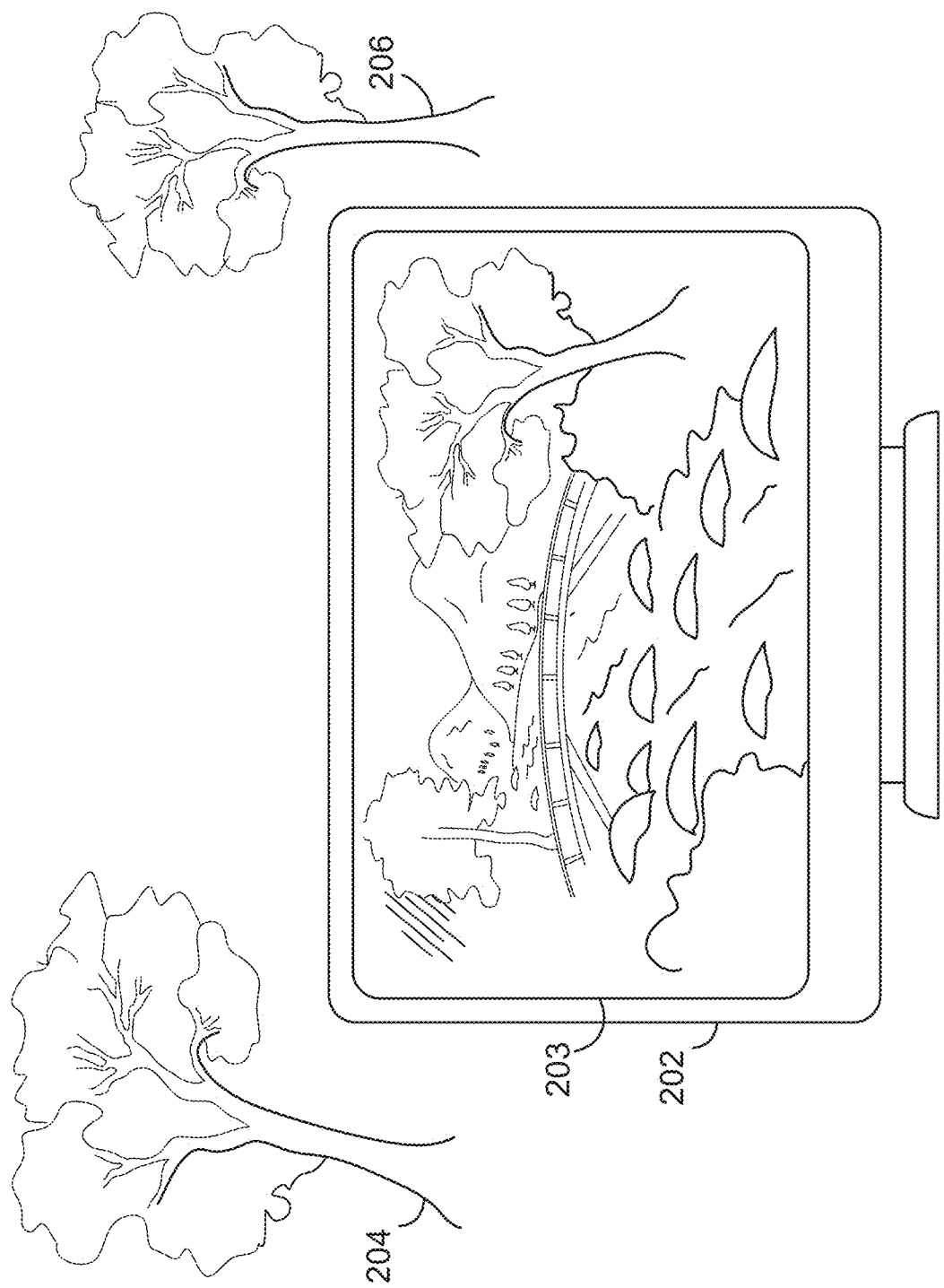
FIG. 2 is a schematic view of a scene including both real-world and virtual elements as displayed on an augmented reality display.

FIG. 2 illustrates an example of an augmented reality presentation in an environment with an external display. The external display 202 is a real-world object. In the case of a video-see-through augmented reality display, video of the external display 202 and of the screen content presentation 203 displayed thereon is captured by the augmented reality client system and displayed to the user in real time. In addition, the augmented reality client system renders and displays virtual objects 204 and 206 to the user. Properties of the external display 202, the camera(s) of the client device, and the client device itself can all affect the colors of the external display 202 as seen on a display of the client device. This can cause a disparity between the colors displayed on the external display 202 and the colors of the virtual objects 204 and 206. Even in the absence of any virtual objects, the color reproduction of the external display 202 as seen through the client device may be unsatisfactory absent color reproduction techniques as described herein.

In the case of an optical-see-through augmented reality display, the user can view the external display 202 directly through the optics of the augmented reality display. It is desirable for the displayed virtual objects 204 and 206 to have an appearance that is consistent with the appearance of the content on the external display 202. However, the external display 202 and the user's augmented reality display may have different display properties, such as different color primaries and different levels of luminance. Moreover, the content displayed on the augmented reality display may have been generated using a different white point or other properties that are different from those of the content displayed on the external display. Such differences may lead to inconsistencies in appearance between the content on the external display and the virtual content, which can detract from the user's enjoyment of the content.

In some embodiments a color reproduction method performed by an augmented reality client device operates as follows. The example process involves detecting the presence of a digital display (the "external display") in the field of view of a video-see-through augmented reality display.

The location of the external display is established and tracked in the field of view of the observer. From this tracking process, the dynamic (changing) region in the client device that overlaps (obscures) the external display are determined.

The client device receives out-of-band information from the external display regarding its properties, such as spectral power distribution of its RGB primaries; ICC or other profiling; and possibly more. In some embodiments, this information may be communicated using the techniques described in T. Li; C. An; X. Xiao, A. T. Campbell; and X. Zhou, "Real-Time Screen-Camera Communication Behind Any Scene," *MobiSys* '15, May 18-22, 2015, Florence, Italy.

The client device applies the out-of-band information to improve the appearance of the external display and displays the improved rendering of the external display seamlessly to the observer.

Example methods as described herein provide improved color reproduction of the external display, as rendered within the local display. In some embodiments, the color reproduction performed by the client device accounts for environmental interference between the observer and the external display (e.g. fog, smog) as well as accounting for a larger gamut on the HMD display (if appropriate) or other processing that might improve the appearance by rendering the color of the external display closer to the intended color. This is especially true for color information intended to have a consistent appearance, such as safety signals or brand/logo colors.

In embodiments wherein a virtual object is displayed in proximity to an image of an external display, the methods described herein may provide a more consistent appearance of the external display with respect to the virtual object.

Some embodiments may be implemented using the following steps.

Part 1. Establishing and Tracking the Location of the External Display in the Field of View of the Observer.

Example methods operate to identify an external display. For the purposes of this description, it may be assumed that the display is rectangular, but may be viewed obliquely, and the processor will therefore be identifying and tracking a projected rectangle, the shape of which is limited to a constrained quadrilateral. Some embodiments identify an external display using techniques described in US20160014350A1.

Once the external display has been identified, the processor operates to accurately track the dynamic position of the external display. Some embodiments perform markerless tracking using techniques described in G. Klein, "Visual Tracking for Augmented Reality," Doctoral Thesis, University of Cambridge, January 2006. Once the initial position is known, the processor will continue to track the location of the external display and determine where the corresponding pixels of the display are in the local display. The tracking subsystem thus operates to provide information to the display system regarding where to insert the rendered external display to appear correct from the observer's point of view.

Part 2. Determine Properties of the External Display.

Through camera data and/or other means, the client device operates to estimate the properties of the external display. In some embodiments, this includes the chromaticity or spectral power distribution (SPD) of the RGB (or other) primaries, and/or peak luminance. Some embodiments operate to ascertain as many of these properties as possible and practical. Various techniques may be used to determine the properties of the external display.

In some cases, the make and model of the display may be read directly via the HMD camera. A database is then accessed and the camera properties are extracted. Similarly, the shape of the display case, logos, or other distinguishing features may be scanned with the camera and a database may be searched on these parameters.

In some embodiments, a spot- or imaging-spectroradiometer operates to measure the SPD of the display directly. In some cases, the display may contain some quantity of pure red, green, and blue regions, which can simplify processing. In other cases, a few seconds of spectral measurements are collected and used to derive the SPD of the individual primaries. For example, principle components analysis may be used to extract basis (fundamental) spectral data from a series of measurements.

In some embodiments, a colorimeter is used instead of a spectroradiometer as described above. A series of measurements may be collected. Once the measurements cover a sufficient percentage of the display gamut, a chromaticity plot may be used in determining an estimate of the display primaries.

Once the SPD or color is measured (e.g. using a spectroradiometer or colorimeter as described above), a database may be searched to find the make and model of the display. Additional display properties may be retrieved from the database.

In some embodiments, the client device (e.g. HMD) determines properties of the external display through direct communication with the external display. In some embodiments, the methods described in T. Li et al., cited above, are used to communicate information within the scene of a display in a fashion that is not obtrusive or otherwise distracting to the user. Information that may be communicated in some embodiments includes properties of the external display such as: spectral power distribution of its RGB primaries; ICC or other profiling; and possibly more.

Part 3. Applying the Determined Properties to Improve the Appearance of the External Display.

Figure 3:
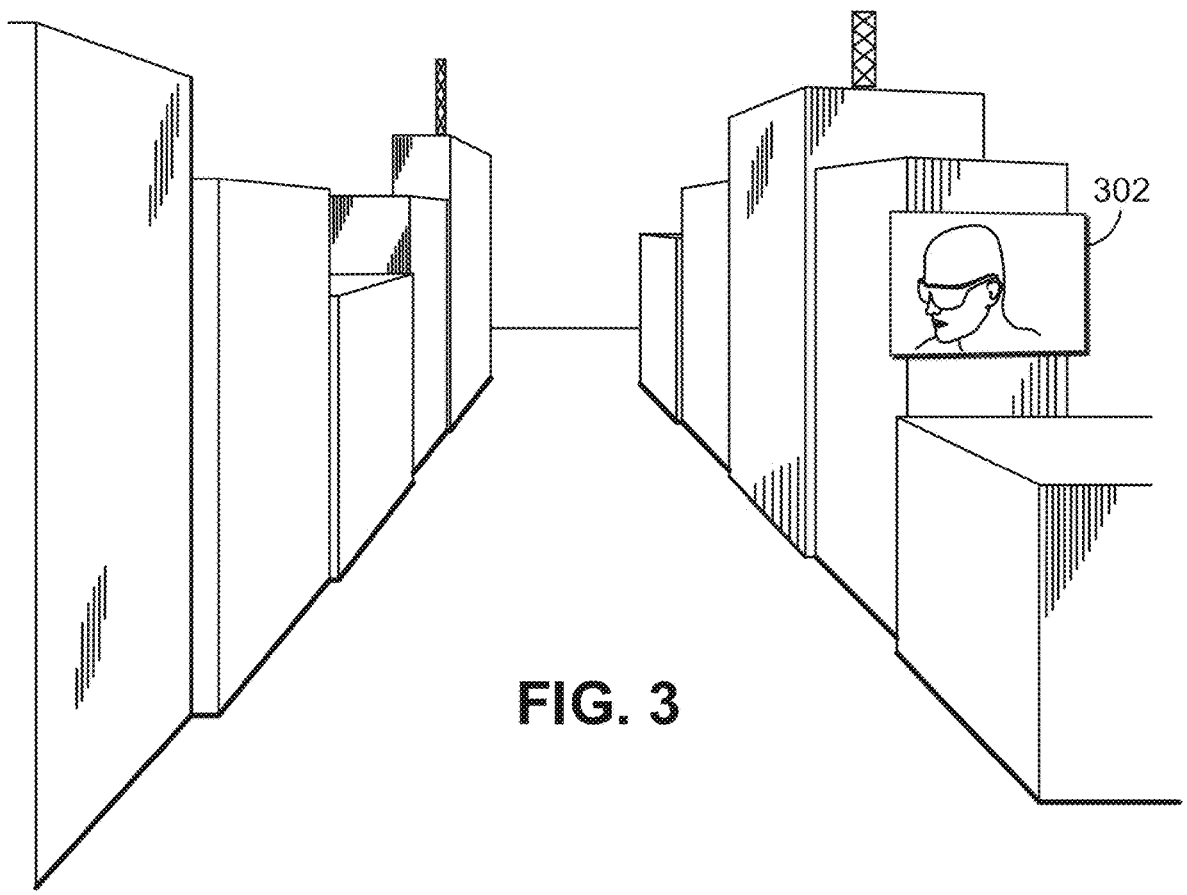
FIG. 3 is a schematic illustration of a real-world scene that includes screen content displayed on an external video display.

FIG. 3 illustrates a real-world scene containing an external display 302, which in this example is a large outdoor advertising video display.

Figure 4:
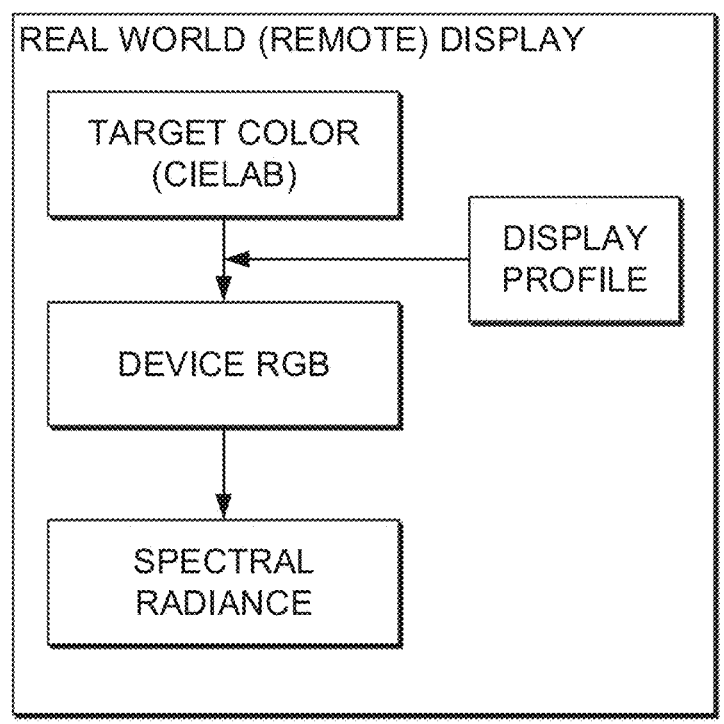
FIG. 4 is a flow diagram of a method performed by an external video display.

FIG. 4 is a flow diagram representing the color processing path of the external display 302. Any given pixel in the external display has a specified target color. The present example makes reference to CIELAB coordinates, but other coordinate systems may be used. The external display processor converts the CIELAB coordinates to device RGB coordinates by way of its display profile. Once the given pixel is activated by the display system, the RGB coordinates result in a predictable spectral radiance being emitted by the external display at this pixel location.

Figure 5A:
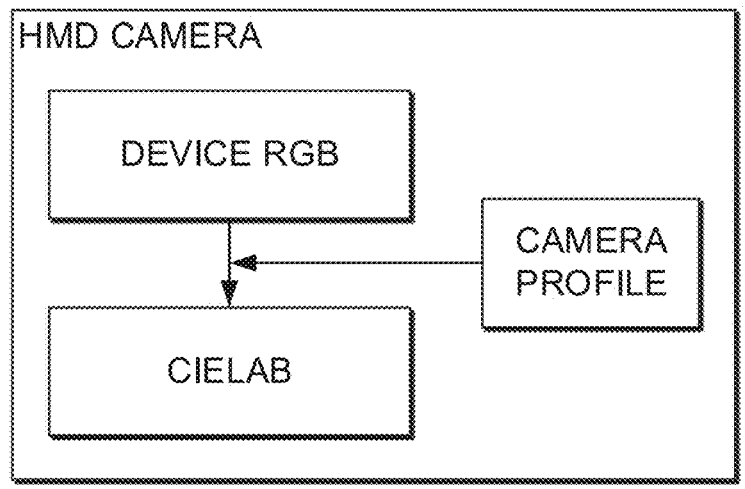
FIGS. 5A-5C are a flow diagrams of a method performed by a client device (e.g. an AR display) in some embodiments.

FIG. 5A is a flow diagram illustrating steps performed at the client device (e.g. an HMD). The spectral radiance of the external display is detected by the camera of the client device and converted to device (camera) RGB values. Using the camera profile, the processor of the client device transforms the RGB to CIELAB or other device-independent color coordinates. Note there is an assumed scene white point built in to this CIELAB calculation. The white point may be determined from the scene content by the client device.

Figure 5B:
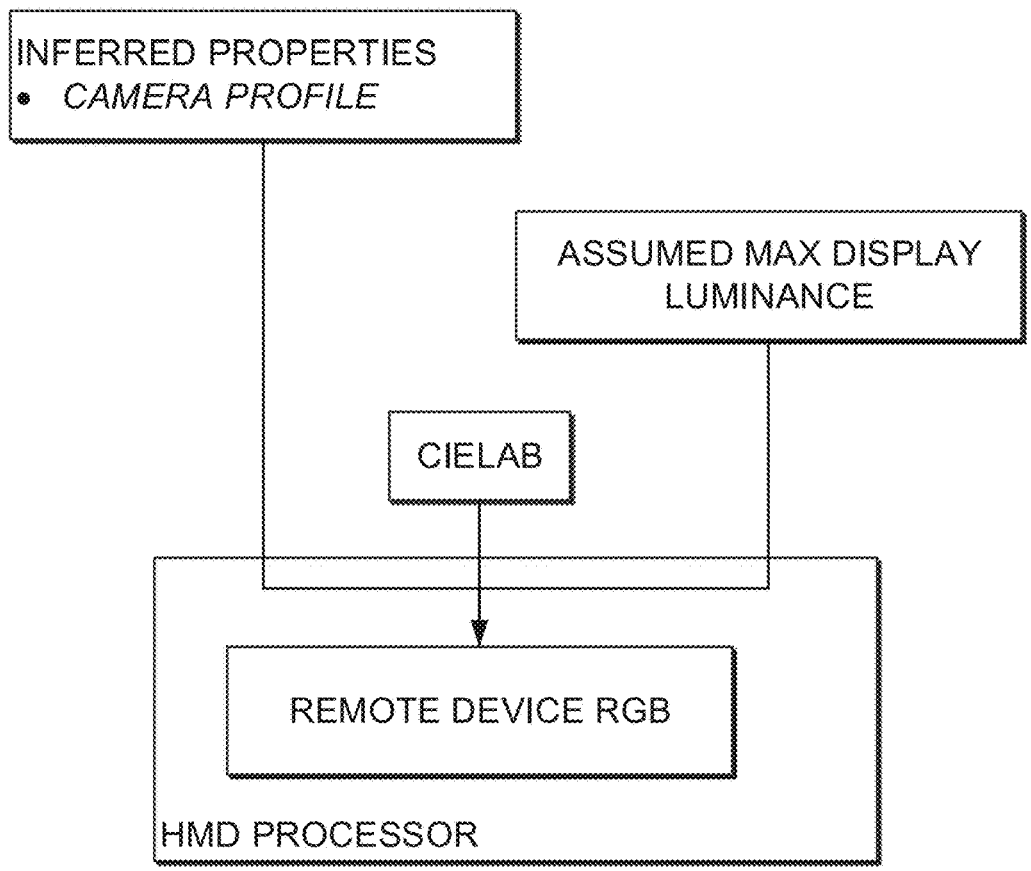

FIG. 5B is a flow diagram illustrating further steps performed at the client device. From the client device camera data, the processor estimates the maximum luminance from the display. This is the resulting CIELAB (and effectively the spectral radiance) from a region of maximum digital counts (e.g. R=G=B=255). From the CIELAB pixel data, the maximum luminance, and the camera profile (inferred from the external display), the digital counts of the pixels in the external display are estimated.

Figure 5C:
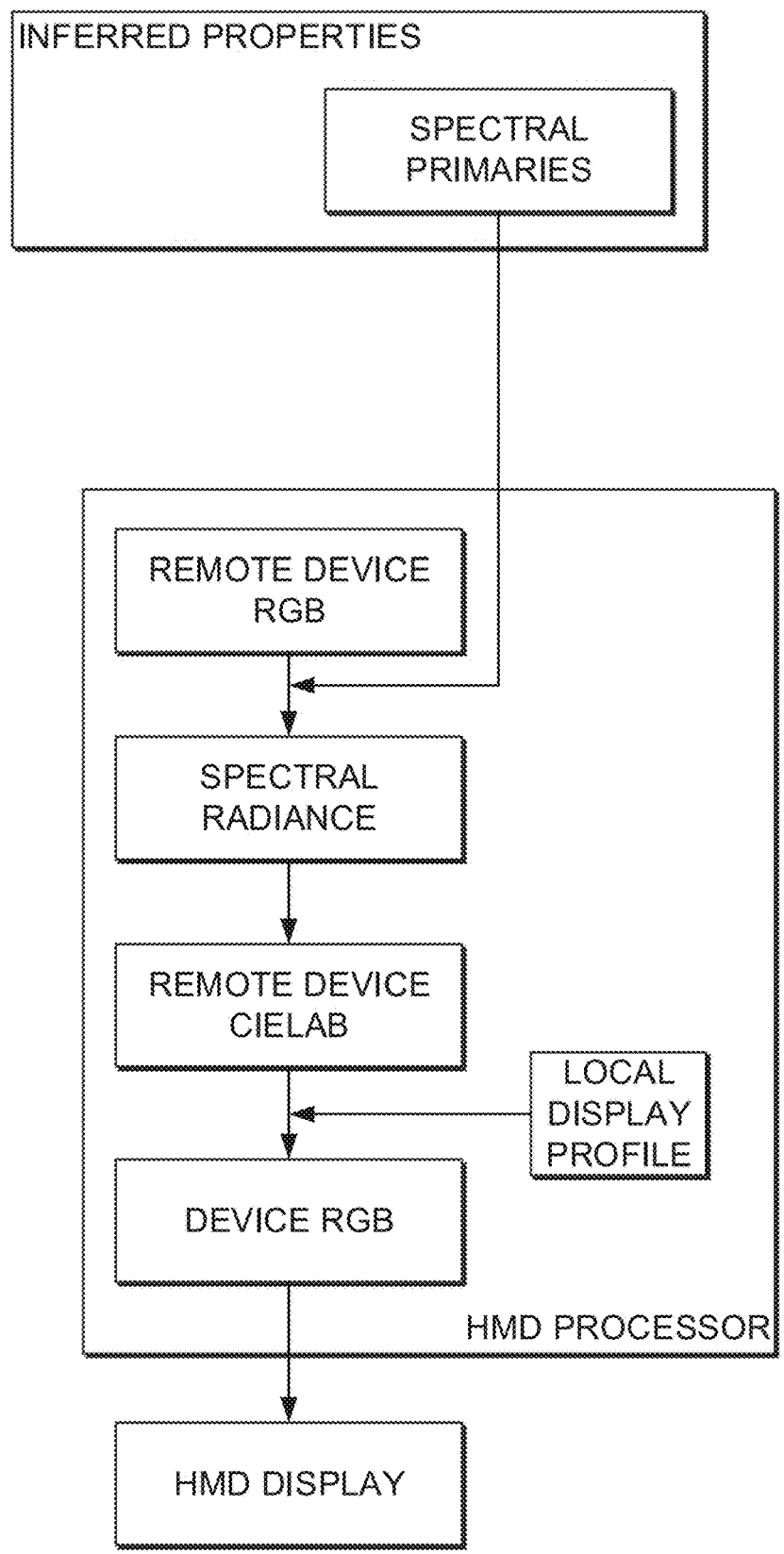

FIG. 5C is a flow diagram illustrating further steps performed at the client device. With the external display RGB and the spectral primaries (communicated from the external display) the intended spectral radiance is estimated. The actual radiance may be decreased due to degradation of the external display or more likely intervening environmental factors (e.g. smog, fog) or the exposure setting on the HMD camera responding to more than just the external display. From the spectral radiance, the intended CIELAB values are determined and are used as the target display color for the local display. The local display profile converts this target CIELAB to device RGB and displays them to the local display. In this fashion, the viewer experiences the intended color.

Part 4. Displaying the Improved Rendering of the External Display on the Local Display Seamlessly to the Observer.

Using the tracking described in Part 1, and by continually updating the HMD display as described in Part 3, the HMD user is shown the appropriate color of the external display, positioned appropriately within their field of view to seamlessly blend into the other real-world content.

Overview of Adjustment of External Content.

Figure 6:
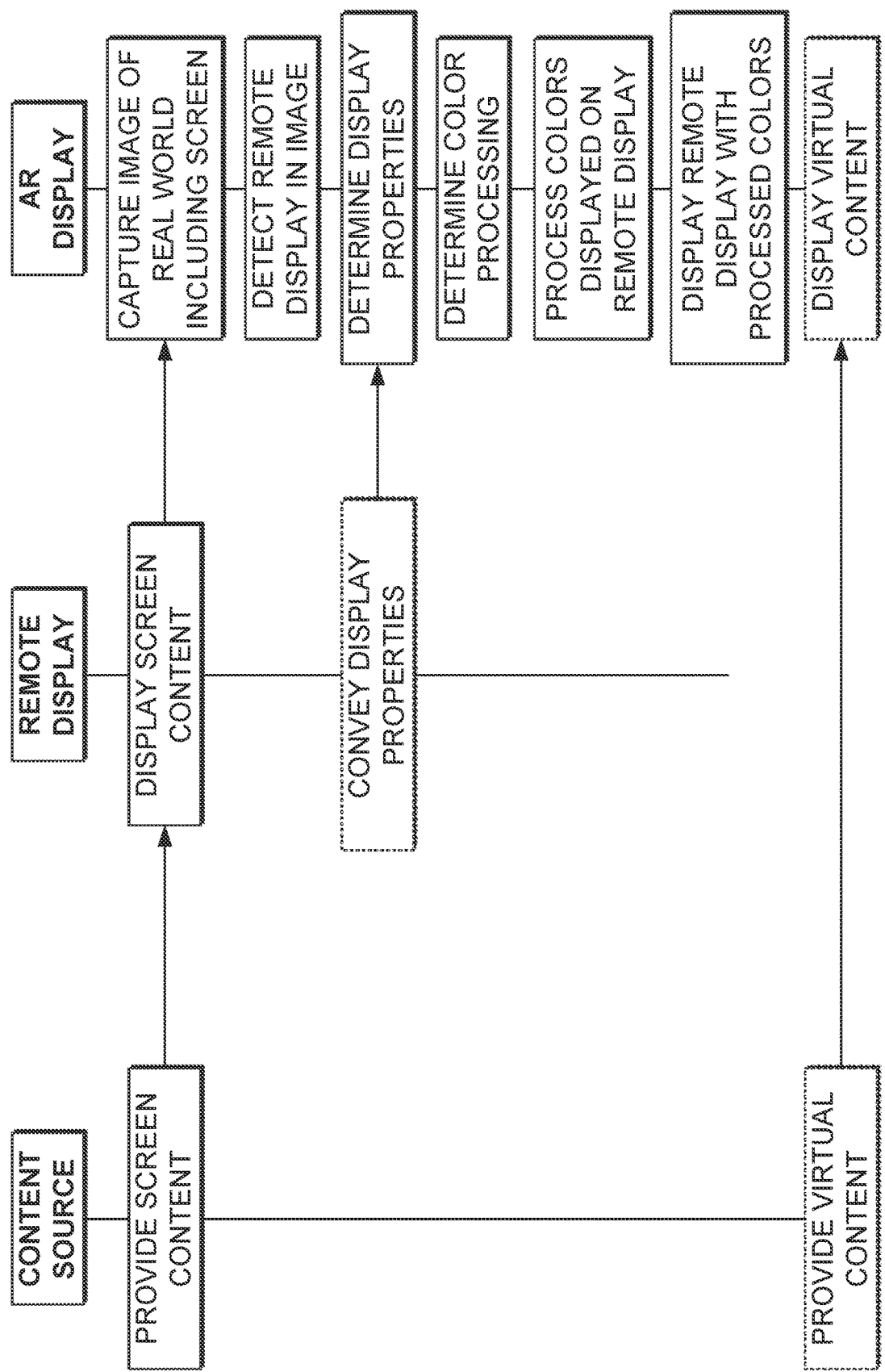
FIG. 6 is a message flow diagram illustrating steps performed in some embodiments.

An example of a method performed in some embodiments is illustrated in FIG. 6. A content source (e.g. a streaming video source) provides content to an external display, such as a television screen. The external display displays the content. A client AR display device in the vicinity of the external display captures video of a real-world scene including the screen content being displayed on the external display. The client device determines the region of the video that includes the external display device. The client AR display also determines properties of the external display. In some embodiments, the properties of the external display may be communicated from the external display itself. Based on the properties of the external display, the client device determines the color processing to be performed on the portion of the video corresponding to the external display. The client device selectively processes the colors in the portion of the video corresponding to the external display and displays the processed video in substantially real time to the user. In some embodiments, the client device also displays virtual content, which may be retrieved in some cases from the content source.

As described above, in some embodiments, color processing proceeds as follows. RGB values are captured by a camera for a region that corresponds to screen content on an external display. In a first conversion, these RGB values are converted to device-independent color coordinates (e.g. XYZ color coordinates or CIELAB L*a*b* coordinates). To simplify the explanation, the example of CIELAB coordinates will be used here. This first conversion may be performed based on a profile of the camera. In a second conversion, these CIELAB coordinates are converted to remote-display RGB values, which represent an estimate of the RGB values being displayed by the external display that result in the color indicated by the CIELAB coordinates. In a third conversion, the remote-display RGB values are converted to intended spectral radiance. This third conversion may be based on the remote-display RGB values and on the radiance of the spectral primaries. In a fourth conversion, the intended spectral radiance is converted to intended CIELAB coordinates. In a fifth conversion, the intended CIELAB coordinates are converted to client display RGB values using a local display profile for display by the client device.

In some embodiments, instead of performing separate conversion steps, two or more of the conversion steps may be combined. For example, consider an embodiment in which the client camera RGB values are represented as $R_c$ $G_c$ $B_c$ and the client display RGB values are represented as $R_d$ $G_d$ $B_d$. The conversion steps may in some embodiments be combined in to a processing step such as the following linear transformation, in which A is a 3×3 matrix.

$$\begin{pmatrix} R_d \\ G_d \\ B_d \end{pmatrix} = A \begin{pmatrix} R_c \\ G_c \\ B_c \end{pmatrix}$$

In some embodiments, such a linear transformation may replicate the outcome of performing separate conversion steps. In other embodiments, the linear transformation may serve as a first-order approximation of the outcome of performing separate conversion steps. In some embodiments, the conversion steps may be combined into a single non-linear transformation step.

In some embodiments, a transformation matrix A (or other color processing parameters) may be calculated in response to detection of an external display device and determination of the properties of that device. In other embodiments, one or more transformation matrices are stored in advance. For embodiments in which more than one transformation matrix is stored in advance, different matrices may be stored for different types of external display. For example, different transformation matrices may be stored for use with LCD screens as opposed to OLED screens, and the like. In some embodiments, the transformation matrix may be adjusted or selected based at least in part on illumination conditions, such as on a white point of the scene.

In some embodiments, the screen-content color transformation (whether implemented as a single transformation or as a series of transformations) is selected such that a user viewing the screen content through a video-see-though head-mounted display will perceive substantially the same colors on the screen as he or she would viewing the same video directly, without the head-mounted display.

Figure 7:
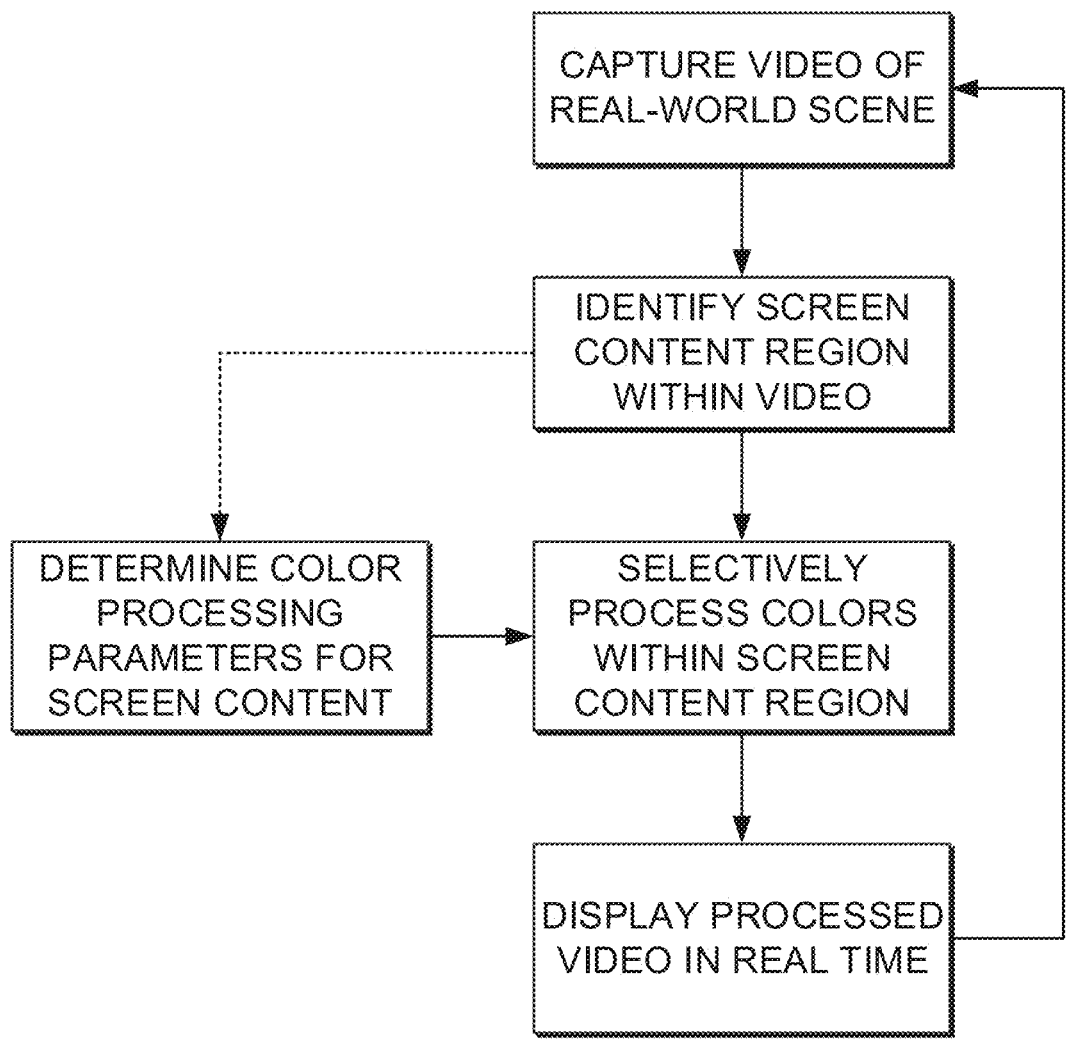
FIG. 7 is a flow diagram illustrating a method performed in some embodiments.

A flow chart of an example method is provided in FIG. 7. In this example, a client device such as a video-see-through head-mounted display captures video of a real-world scene and identifies a region of screen content within the captured video. The client device determines color processing parameters, such as the elements of a transformation matrix A or other parameters for color coordinate transformation described herein. The client device selectively processes the colors (e.g. RGB values) within the region of screen content. In some embodiments, the screen content color processing is not performed outside the region of screen content (although other color processing may be performed outside the region of screen content). The processed video is then displayed to the user substantially in real time (although some processing delay is unavoidable).

Adjusting Externally Displayed Content to Match Locally Displayed Virtual Content.

In some embodiments, a client device associated with an augmented reality or mixed reality (AR/MR) display is used to modify, enhance, or re-render content seen on an external display for compatibility with virtual content to be displayed in the AR/MR display. Compatibility may include adjusting the brightness and/or the color of the externally displayed content so that it matches or is otherwise consistent with the brightness or color properties of the displayed virtual content.

In a first example, a user may have a head-mounted display equipped with a forward-facing camera and a "see-through" AR/MR display. The AR/MR display allows the user to see the surrounding environment, including any nearby external display devices. In some embodiments, the following steps may be used to determine properties of the content being shown on the external display and to adjust the appearance of the externally displayed content for compatibility with other content (e.g. virtual content, including augmentations or realistically rendered objects) to be displayed in the AR/MR display.

Using the forward-facing camera, images of the nearby environment are captured.

The captured images are analyzed to detect a nearby external display. This can be done using various computer vision techniques for object recognition, such as those described in Nacenta, Miguel, "Computer Vision Approaches to Solve the Screen Pose Acquisition Problem for PerspectiveCursor," Technical Report HCI-TR-06-01, Computer Science Department, University of Saskatchewan, Dec. 5, 2005. Such techniques may be used to identify the presence of the external display device, and to provide a location and extent or "footprint" of the external display device within the captured image.

The extent of the content displayed on the external display device may be identified. For example, this can be done by starting with the footprint of the external display device and removing from consideration the frame or bezel of the external display device, so that only the active screen area of the external display is considered in subsequent steps. Alternately, the captured images may be compared across time to determine what rectangular area within the footprint of the external display device is changing over time, and this area may be identified as the active screen area to be considered in subsequent steps.

The captured samples within the extent of the content displayed on the external display device (e.g. within the 'active screen area') may be analyzed to determine visual properties of the externally displayed content. For example, a luminance histogram of these samples may be created to determine luminance properties such as minimum, maximum, and average luminance. Likewise, the color properties of these samples may be analyzed to determine color properties of the content as displayed by the external display device. Such analyses may be done for a single captured frame, or may be computed over a time interval in which multiple (or many) captured frames are used as input.

The properties of the externally-displayed content may be used to determine modifications to the externally displayed content which would improve compatibility with the other content (e.g. virtual content, including augmentations or realistically rendered objects) to be displayed in the AR/MR display. For example, the brightness or color properties of the externally displayed content may be adjusted so that the user sees the same or similar brightness and color properties between the user's view of the externally displayed content and the other content displayed in the AR/MR display. The modifications may take the form of brightness or color adjustments to be made to the captured samples within the extent of the content displayed on the external display device. The captured samples may be adjusted, and the resulting adjusted samples may be rendered in the AR/MR display as an 'overlay' so that the user sees the adjusted samples of the externally displayed content in place of the real-world (or 'see-through') view of that content.

In some embodiments, the user of the AR/MR HMD may encounter the external display which is already displaying the externally displayed content. The detection of the external display may trigger the additional steps to determine and adjust the brightness and/or color properties of the externally displayed content as seen by the user through the AR/MR HMD. The other content (e.g. virtual content, augmentations, and/or realistically rendered objects) may be 'companion content' produced for use with the externally displayed content. For example, if the externally displayed content is a football game, the other content to be displayed in the AR/MR display may be scores, statistics, and commentary about the football game. As another example, if the externally displayed content is a movie, then the other content may be a virtual rendering of one of the characters in the movie who appears next to the screen and makes comments about the movie. In the case of companion content, there may be an additional step to identify the content currently playing on the external display so that the corresponding other content (e.g. virtual content, augmentations, and/or realistically rendered objects) may be generated, retrieved from a network, or otherwise obtained and prepared for rendering in the AR/MR display device, along with the externally displayed content.

In another variation of the above embodiment, the AR/MR HMD user may encounter the external display, but the externally displayed content may not be already playing on the external display. Instead, the detection of the external display device (either visually as described above, or via a network connection and device discovery process, e.g. via UPnP) may cause the client device (e.g. the AR/MR display or device or associated controller device) to instruct the external display device to begin playing content selected by the client device. For example, the client device may have access to virtual content to be displayed as a companion presentation for a given movie, and the client device may (after detecting the presence of the external display device in the environment) request the external display device to begin playing the movie, so that the client device may then augment the movie viewing experience by displaying the companion content on an AR/MR display. In this case, the client device does not need to identify what content is playing on the external device (as it already knows what content is playing). The client device may operate to identify the location and extent (e.g. "footprint") of the external display device in the user's view, and it may verify visually that the expected content is playing on the detected external display device, in case there are multiple external display devices in the environment. The client device may operate to adjust the brightness and/or color properties of the externally displayed content for compatibility with the other content (e.g. the companion content, which may be virtual content, annotations, and/or realistically rendered objects) to be displayed in the AR/MR HMD.

In some embodiments, the other content to be displayed in the AR/MR HMD may not be companion content and may not have been prepared specifically for use with the externally displayed content. For example, the brightness and/or color properties of the externally displayed content may be adjusted for compatibility with user interface (UI) elements and annotations normally displayed in the AR/MR HMD. This may be done as a style point or to ensure that the UI elements and annotations displayed in the AR/MR HMD are still visible in the presence of a potentially bright external display image.

In a second example, a user may have a head-mounted display equipped with a forward-facing camera and a "see-through" AR/MR display. As before, the AR/MR display allows the user to see the surrounding environment, including nearby external display devices. The following steps may be used to determine properties of the external display and to use such properties to adjust the appearance of the externally displayed content for compatibility with other content (e.g. virtual content, including augmentations or realistically rendered objects) to be displayed in the AR/MR display.

Using the forward-facing camera, images of the nearby environment are captured.

The captured images are analyzed to detect a nearby external display. This can be done using various computer vision techniques for object recognition, such as those described in Nacenta, cited above. Such techniques may be used to identify the presence of the external display device, and to provide a location and extent ("footprint") of the external display device within the captured image.

The extent of the content displayed on the external display device is identified. For example, this can be done by starting with the footprint of the external display device and removing from consideration the frame or bezel of the external display device, so that only the active screen area of the external display is considered in subsequent steps. In some embodiments, the captured images may be compared across time to determine what rectangular area within the footprint of the external display device is changing over time, and this area may be identified as the active screen area to be considered in subsequent steps.

Properties of the external display which would affect the externally displayed content are determined. The properties of the external display may be determined by identifying the make and model of the external display and retrieving properties corresponding to that make and model from a database. The database may be local to the client device (e.g. AR/MR HMD device or its associated controller). Alternately the database may be accessible to the client device via a network. The properties of the external display may alternately be determined by communicating with the external display (e.g. using point to point wireless communication, or by communicating with the display device over a network). The determined properties of the external display may include fixed properties of the external display (e.g. maximum achievable brightness, color primaries, color space). The determined properties of the external display may include variable properties which are not intrinsic to a make and model of display (e.g. current brightness or color settings, current display 'preset' mode in use, or an indication of the age of the display device).

The determined properties of the external display may be used to determine modifications to the externally displayed content which would improve compatibility with the other content (e.g. virtual content, including augmentations or realistically rendered objects) to be displayed in the AR/MR display. For example, the brightness or color properties of the externally displayed content may be adjusted so that the user sees the same or similar brightness and color properties between the user's view of the externally displayed content and the other content displayed in the AR/MR display. The modifications may include brightness or color adjustments to be made to the captured samples within the extent of the content displayed on the external display device. The captured samples may be adjusted, and the resulting adjusted samples may be rendered in the AR/MR display as an 'overlay' so that the user sees the adjusted samples of the externally displayed content in place of the real-world (or 'see-through') view of that content.

Additional Features of Some Embodiments

In some embodiments, the client device operates to track and process multiple external displays simultaneously.

In some embodiments, colors used in rendering a virtual object are selected so as to be consistent with colors on the external displays as reproduced through a video-see-through AR display.

In some embodiments, to enhance the user's experience beyond simply correctly rendering the external display, additional content is inserted that is determined to be related and relevant to that being shown on the external display. For example, if a movie scene is being displayed, the client device may operate to find related content (e.g. a location of a nearby store selling related merchandise) and to display the content adjacent to the external display in the user's field of view. To align the color experience with the content on the display, the client may follow the color processing path described in Part 3 above ("Applying the inferred properties to improve the appearance of the external display").

In some embodiments, where changes to local environmental conditions lead to changes in the color of the external display, methods described herein operate to compensate for those changes and correct the color for the user.

In very bright or dim conditions, the local camera may be configured to properly capture the color of the external display (by, for example, decreasing or increasing the exposure time). Using methods described here, the external display may be properly rendered in situations when it might otherwise be washed out or too dim for the user (or viewer) to see.

Color Reproduction Based on Angular Size of Objects.

When content is inserted into an augmented reality system or a video pass-through system (e.g. phone or tablet) the apparent size of the object, from the perspective of the observer, can affect the color as perceived by that observer. This may be especially apparent when the objects inserted are faces. For example, face swapping applications or other face modification techniques may change the size of the input face before final display. Given a plausible range of changes in object size, as well as the available range of screen size, a noticeable color shift could become apparent. The angular size of an object can thus affect the color of an object. That is, the color perception of an artifact is a function of the size of that artifact in the visual field of the observer. If the object changes in angular size (e.g. if augmented reality content is modified to appear to approach or recede from the observer) the perceived color can change even with the same RGB values displayed.

In some embodiments, the processor detects the angular size (with respect to the observer) of content determined to be of interest. In the general case, this is augmented reality content, but for video pass-through (phone or tablet) this could be anything in the field of view. A video pass-through example may be to detect a logo or other color-critical item and account for its visual size when rendering to the display. For either application, models are applied to compensate for the observer vision properties based on the size of the viewing field, adjusting the color of the interesting content to account for its apparent size.

Once the angular size of content is determined, this and other parameters (e.g. environmental parameters such as white point) are used to generate a rendering model. The inserted content is then rendered (or re-rendered) to set the color based on that apparent size. If the inserted object remains in the field of view but has changed size with respect to the observer, a new rendering model is determined, and the object is re-rendered via forward and inverse color modeling techniques. In some embodiments, the rendering model is at least partly pre-calculated using an expected range of object sizes.

In some embodiments, the display system such as AR glasses, or a phone/tablet operates to account for the apparent visual size of any rendered content. Such methods may operate to employ color models that account for several factors, including the age of the observer and the visual size of the content. A model that may be used in some embodiments is the CIE 2006 model. Existing techniques alter the geometric size of an object but do not account for color changes.

Methods as described herein may create more realistic, and less obtrusive, renderings of objects that change size in the field of view, or those that are rendered a different size than originally seen by the observer (e.g. in "face swapping" applications). Such methods may be used not only with inserted content but also may detect known objects in the field of view and correct their color after accounting for their visual size.

Such methods may be particularly well suited when a color match is being presented to the observer, such as when a rendered object is intended to match a real-world object. When one or both of these objects change apparent size with respect to the observer the match may break down absent color compensation methods as described herein.

Figure 10:
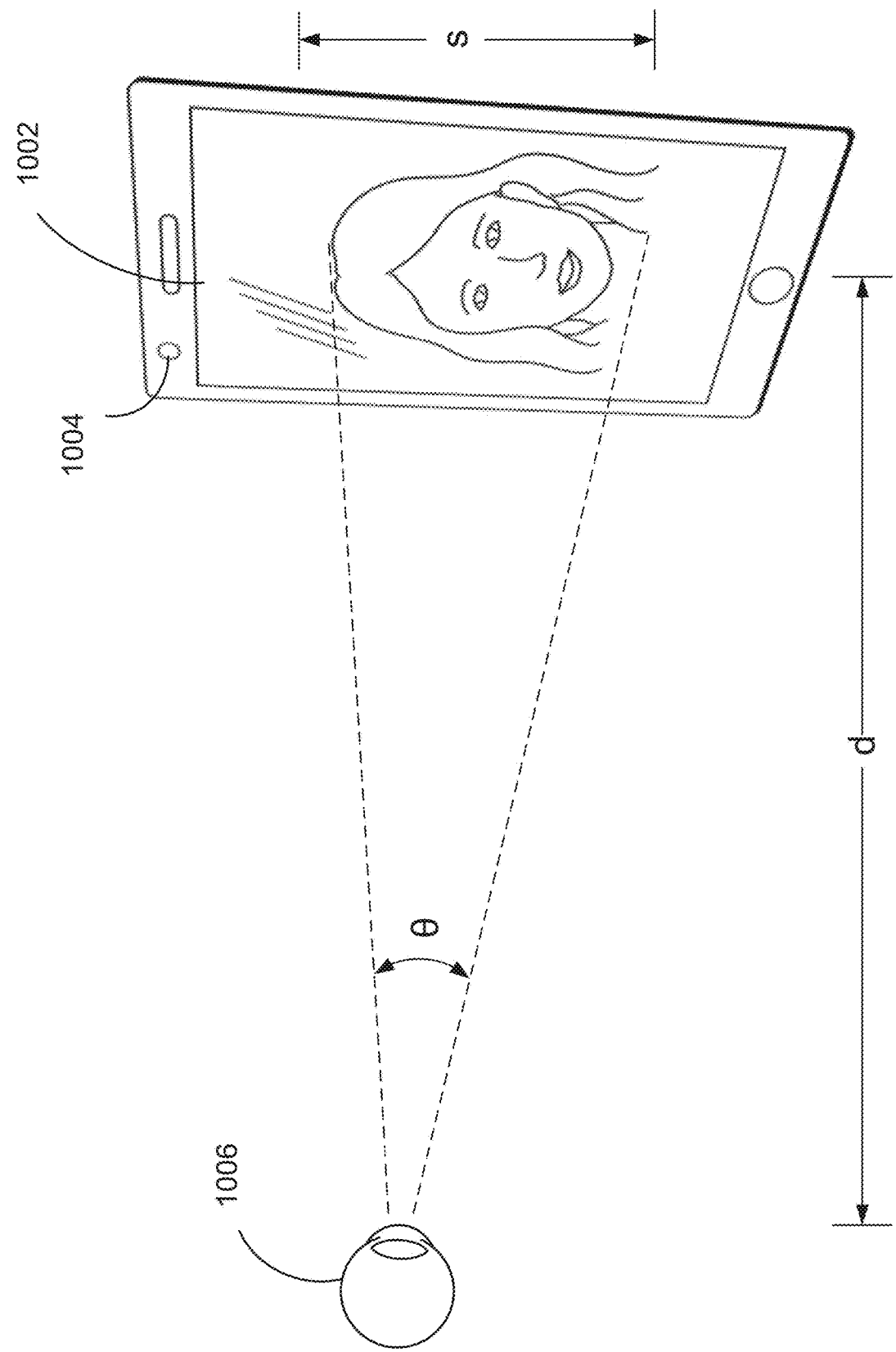
FIG. 10 schematically illustrates determination of an angular size of an object displayed on a client device.

FIG. 10 is a schematic perspective diagram showing how the angular size of the rendered content is determined in some embodiments. The viewing angle $\theta$ will be used as one of the parameters in the CIE 2006 model or other model of spectral sensitivities of the observer. Angle $\theta$ may be calculated as $$\theta = 2\tan^{-1}(s/2d)$$

The model of spectral sensitivities is used in some embodiments to adjust the rendering pipeline.

A procedure to account for rendered content visual angular size may be applied anytime an object is inserted or if its size increases or decreases (for example, if the observer should be experiencing the inserted content moving closer or farther away). During the initial rendering, or re-rendering as the object moves, a step may be performed of determining the distance from the display to the observer, which allows for the angular size to be calculated, and from there the rendering can proceed.

Figure 11:
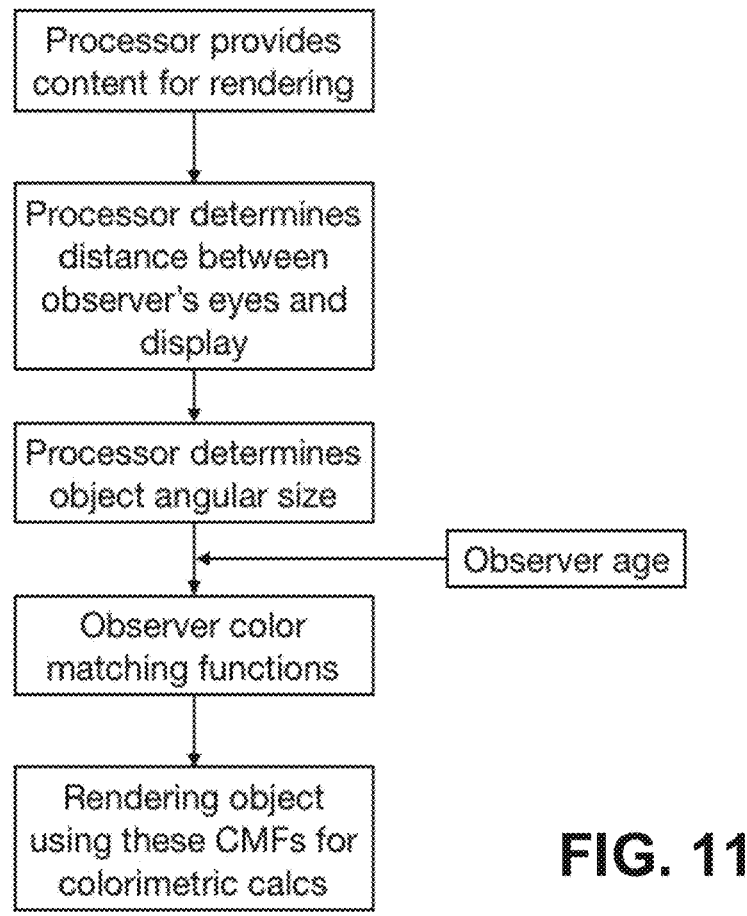
FIG. 11 is a flow diagram illustrating a method of size-based color adjustment performed according to some embodiments.

FIG. 11 is a flow chart illustrating a rendering method performed in some embodiments. A display device identifies content for rendering. This content may be a newly-inserted object or an object that has changed in size or position. The processor determines an angular size of the object, for example based on the size of the object and the distance from the object to the observer's eyes as illustrated in FIG. 10. Other techniques for determining the angular size of the object may be implemented, for example when the display device is an HMD. Some embodiments operate to consider the observer's age, which may have an effect on the user's color perception. Other embodiments may use an average age or other representative age without determining the actual age of the current user. Appropriate color matching functions are determined based at least in part on the object angular size and/or the observer age. The object may then be rendered (or the rendered colors may be updated) based on the determined color matching functions.

In some embodiments, the use of observer-dependent color matching functions may be implemented using techniques described in patent application Ser. No. 16/280,866, filed Feb. 20, 2019, entitled "Method and Apparatus for Increasing Color Accuracy of Display by Compensating for Observer's Color Vision Properties," the entirety of which is incorporated by reference herein.

Embodiments using color reproduction based on angular size may be employed when colors are being matched between an RGB display and the real world. Such matches are likely to be metameric matches, where the physical properties (the spectral nature of the materials) do not match, but the color does match. This is a feature of the visual system that allows the observer to perceive a perfect color match between rendered and real world objects.

Applications of metameric matching include use when an observer is searching for a product or object of a specific color and is comparing the rendered color to the real world color. In this case, changing the apparent size of the could impact the color match. A small rendering next to a distant (and therefore visually small) object may be perceived as a perfect match, but when the object is approached, and it fills more of the field of view, the match may break down. If the rendered RGB color is not adjusted, it will appear the same, and potentially not match the larger real world object.

Another application for metameric matching is in the coordination of colors (colloquially called "matching," as in "does this shirt match this tie?"). This type of matching is done for many color-critical purposes, for example, fashion (clothing), furnishings, paint, and more. For these applications, the hue is often the most critical dimension being evaluated. In the same way that the exact match described above can break down, the hue of the real world object could change as the visual field size changes. In this case, the match selected by the observer will no longer seem pleasing, or at best will appear as a different set of colors.

Changes to color matching functions due to object size changes are analogous to observer changes and should be expected to have the same effect on the metameric matches as other changes. For example, changing the illuminant will potentially change a metameric match. In some embodiments described herein, colors of the displayed object may be are adjusted to preserve the match. Colors may be adjusted using the color matching functions described in CIE 2006.

As shown in FIG. 10, to accurately determine the angular size of the inserted content, some embodiments operate to measure the distance to the observer. This can be done using, for example, the methods described in Peyman Alizadeh, *Object Distance Measurement Using a Single Camera for Robotic Applications*, MSc Thesis, Laurentian University Sudbury, Ontario, Canada (2015) for detection of object distances using a monocular camera. Methods such as the use of a single front-facing camera or use of range-finding technology (e.g. a time-of-flight sensor) may be employed. FIG. 10 illustrates a client device with a display 1002 being viewed by an observer 1006. The client device in this example has a front-facing camera 1004. The client device operates to determine a viewing distance d to the observer, based for example on the size of an image of the observer as captured by the camera 1004 (e.g. based on an assumption that the user's pupil distance is around 60 mm, or based on other relatively consistent facial features) or on other distance measuring techniques, such as those described by Alizadeh. Some embodiments may use a default distance to the observer based on expected usage of the client device. The observer observes an object with angular size θ, where θ may be determined trigonometrically based on the viewing distance d and on the physical size s of the object as rendered on the screen.

Some embodiments perform size-based color reproduction for real-world objects in a scene. Logos and other color-sensitive items may be identified in the scene (e.g. by comparison to a database) and then color-corrected based on the size. This makes use of information on the actual color of the logo or item, which may be known (e.g. may be available in a database). Such embodiments may be performed in a video pass-through system (e.g. phone/tablet) since all content is rendered to the display.

Figure 12:
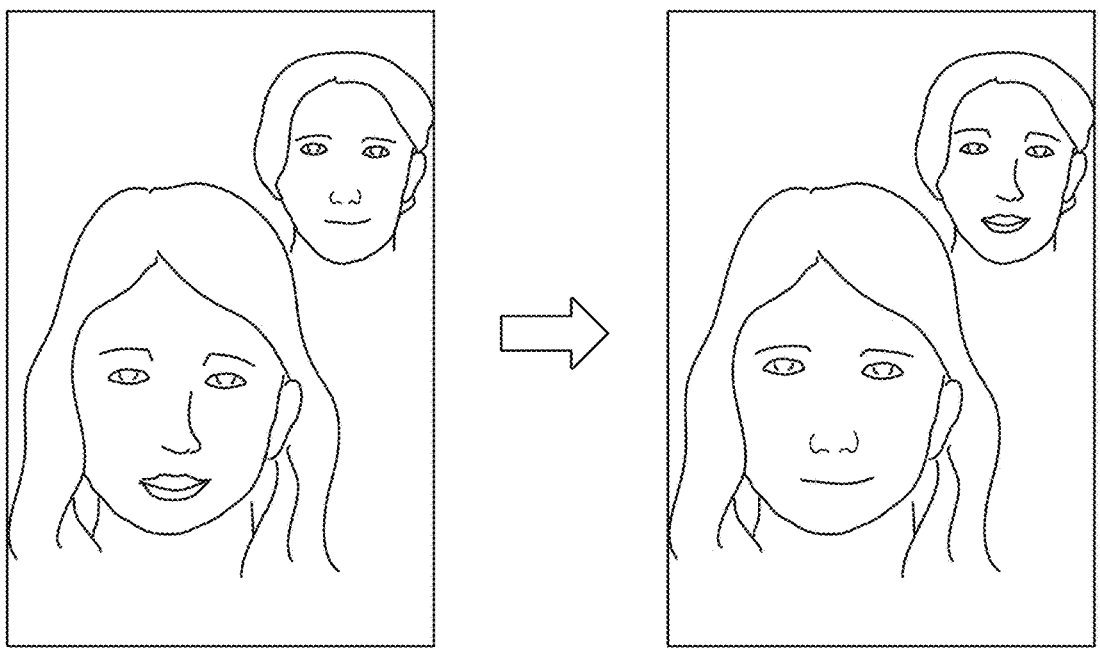
FIG. 12 is a schematic illustration of a face-swapping application in which size-based color adjustment may be used.

Popular phone applications include several that perform "face swapping" or other facial adjustment approaches. It is established that people are very sensitive to the accuracy of face- and skin-tone colors. As a result, these applications stand to particularly benefit from more accurate rendering that accounts for the size of the inserted content. As illustrated in FIG. 12, performing a "face swap" on an original image (on the left) to generate a swapped image (on the right) can involve changing face sizes by a factor of two or more. Embodiments that adjust colors based on object size may be implemented to provide more accurate color matching. Regarding more traditional parameters to accurate rendering, it is possible for the adjustment to have moved some skin-tones to a region of the field of view with a different illuminant (white point). For this case the rendering engine may operate to produce more accurate colors by accounting for this difference in addition to the size effect.

Client Devices Used in Some Embodiments

Embodiments described herein may be implemented using various different types of augmented reality display devices. Examples of head-mounted displays that can be employed in exemplary embodiments are illustrated schematically in FIGS. 8 and 9.

Figure 8:
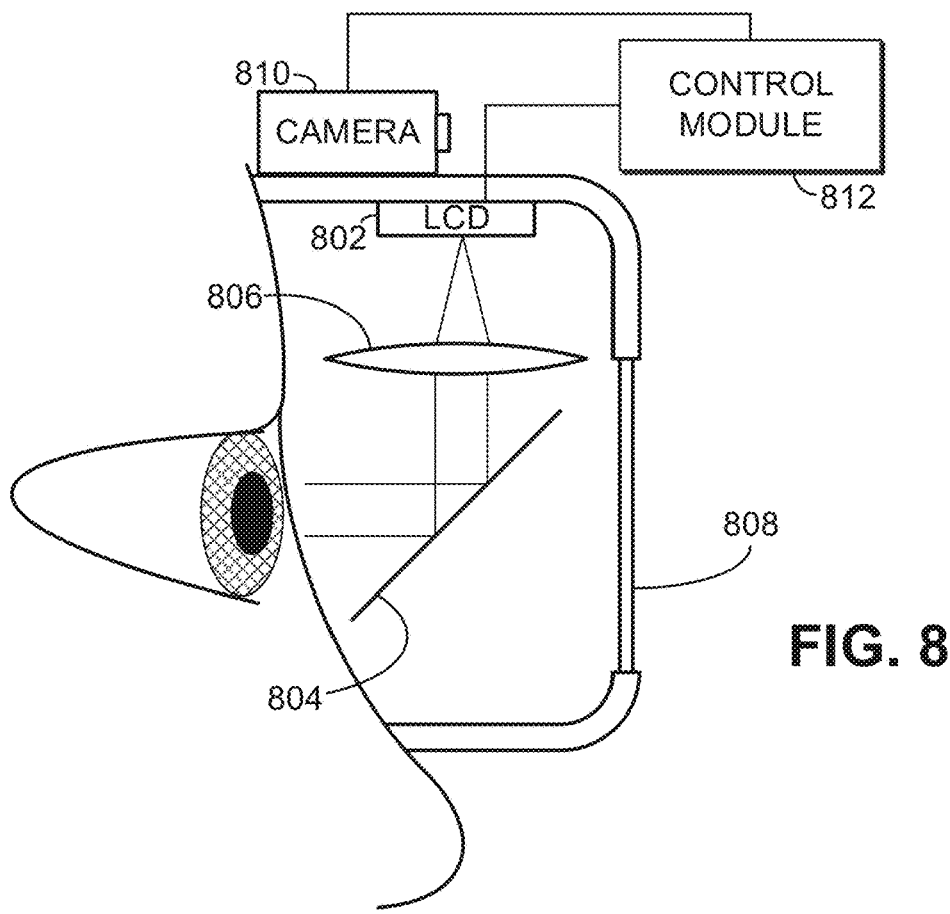
FIG. 8 is a schematic illustration of an optical-see-through head-mounted display that may be used in some embodiments.

FIG. 8 illustrates an optical-see-through head-mounted display. In the embodiment of FIG. 8, virtual content is rendered using a liquid-crystal display (LCD) 802. A partly-transparent mirror 804 (e.g. a half-silvered mirror or a beam splitter) allows a user to see both the real world and an image of the content displayed by the LCD. Viewing optics 806 is provided to enable the user to focus on the virtual content. The LCD, viewing optics, and partly-transparent mirror are components of a primary display. A protective shield 808 is mounted at a position that is external to the primary display.

The head-mounted display of FIG. 8 includes a forward-facing camera 810 that operates to assist in tracking the current orientation of the user's head. In some embodiments, the forward-facing camera is also used to measure the optical properties (e.g. the illuminance) of the current real-world scene. In other embodiments, one or more separate illuminance sensors are used to measure optical properties of the scene. A control module 812 controls the display 802. The control module 812 may use information on the illuminance (and in some embodiments, the white point) of the scene to control the brightness of the virtual content displayed on the LCD. It should be noted that while LCD displays are used herein as an example, other types of displays may alternatively be used. With the optical-see-through display of FIG. 8, a user has a direct view of the real world (through partly-reflective mirror 804). The user may also view virtual objects displayed on the LCD 802.

Figure 9:
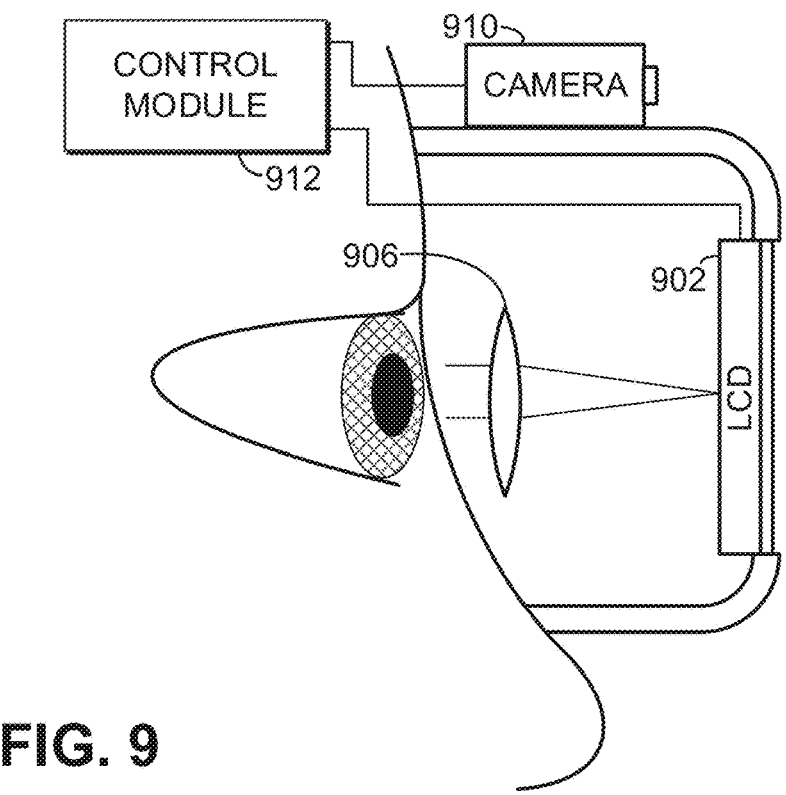
FIG. 9 is a schematic illustration of a video-see-through head-mounted display that may be used in some embodiments.

The head-mounted display of FIG. 9 is a video-see-through head-mounted display device. The display includes a forward-facing camera 910 that captures a real-time image of the real-world environment. Real-time video of the real-world environment (possibly after processing) is displayed on an LCD display 902. Virtual content may also be displayed on the LCD display 902. Viewing optics 906 is provided to enable the user to focus on the LCD display. A control module 912 controls the LCD display 902. The control module 912 may use information on the illuminance (and in some embodiments, the white point) of the scene to control the brightness of the virtual content displayed on the LCD. It should be noted that while LCD displays are used herein as an example, other types of displays may alternatively be used. With the video-see-through display of FIG. 9, a user has a real-time video view of the real world together with any virtual objects displayed on the LCD 902.

Adjustment of Virtual Content.

Some embodiments operate to adapt colors of virtual content to improve compatibility between colors of the virtual content and colors displayed on a physical display. Such embodiments may be used with both optical-see-through and video-see-through head mounted displays.

Consider a video presentation on a conventional television which is being watched by a viewer wearing an HMD. An application on the HMD is supplying virtual content associated with the video. It is desirable for the colors of the virtual content to be a believable match for the colors displayed on the television. Color differences can make the virtual content less than fully integrated with the primary video.

Some example embodiments operate as follows. The presence of a digital display (e.g. an external display) in the field of view is detected. The location of the external display in the field of view of the observer is determined. From this, the dynamic (changing) region in the local display that overlaps (obscures) the external display is known (or can be determined).

A client device, which may be associated with an HMD or other local display, receives out-of-band information which describes properties of the external display, such as spectral power distribution of its RGB primaries; International Color Consortium (ICC) or other profiling; and possibly more. As an example, this information may be communicated using techniques described in Real-Time Screen-Camera Communication Behind Any Scene. T Li; C An; X. Xiao, A. T. Campbell; and X. Zhou, *MobiSys* '15, May 18-22, 2015, Florence, Italy.

The out-of-band information is used in generating virtual content which is compatible to the appearance of content seen on the external display. The virtual content is displayed on the local display using colors that have been generated or adjusted for consistency with the content shown on the external display.

Some embodiments operate to identify an external display. In some cases, the display may be rectangular, but may be viewed obliquely, and the client device therefore may be operable to identify and track a projected rectangle, the shape of which may approximate a constrained quadrilateral.

The client device may further operate to track the dynamic position of the external display, e.g. using markerless tracking. Once an initial position is known, the client device may continue to track the location of the external display and determine where the corresponding pixels of the display are in the local display.

Through camera data and other means, the client device may estimate properties of the external display. Examples of display properties may include the chromaticity or spectral power distribution (SPD) of the RGB (or other) primaries, and/or peak luminance. This may be summarized in an ICC color profile corresponding to the external display operation.

In some embodiments, the make and model of the display may be read directly via the HMD camera. A database is then accessed and the external display properties are extracted. Similarly, the shape of the display case, logos, or other distinguishing features may be scanned with the camera and a database searched on these parameters.

In some embodiments, a spot- or imaging-spectroradiometer may operate to measure the SPD of the display directly. In some cases, the display may contain some quantity of pure red, green, and blue regions. In other case, a few seconds of spectral measurements may be used to infer the SPD of the individual primaries. For example, principle components analysis may be used to extract basis (fundamental) spectral data from a series of measurements.

In some embodiments, a colorimeter is used instead of a spectroradiometer. A series of measurements may still be advantageous. In cases where the measurements cover a sufficient percentage of the display gamut, a chromaticity plot may permit a good estimate of the display primaries.

Once the SPD or other color properties have been measured, a database may be searched using the measured SPD or color information as the query input. As a result, the make and model of the display may be identified, and/or additional properties of the display may be retrieved.

In some embodiments, color properties of the external display are retrieved through direct communication between the external display and the HMD or other client device. Such communication may be conducted via a wireless radio communication between the HMD and the external display (e.g. Bluetooth or NFC), or via a wireless network (e.g. one or more of a cellular and a WiFi network). In some embodiments, the communication may be embedded in the visible light coming from the display. As an example, this information may be communicated using techniques described in Real-Time Screen-Camera Communication Behind Any Scene. T Li; C An; X. Xiao, A. T. Campbell; and X. Zhou, *MobiSys* '15, May 18-22, 2015, Florence, Italy. Relevant properties of the external display may include: spectral power distribution of its RGB primaries; peak luminance of the external display; or ICC or other profiling, among other possibilities. In some embodiments, current device settings of the external display (e.g. current color settings, a current brightness setting, a current display 'preset' mode in use, etc.) may be communicated in addition to fixed properties of the external display device.

The determined properties of the display may be used to adapt the appearance of virtual content which may be shown to augment the content of the external display.

The HMD may generate or adjust virtual content for display within the HMD to match the determined properties (e.g. color and brightness properties) of the external display.

Adjusting Virtual Content Based on Captured View of the Externally Displayed Content.

In some embodiments, a client device associated with an augmented reality or mixed reality (AR/MR) display is used to modify, adjust or enhance virtual content to be displayed in the AR/MR display for compatibility with content displayed on an external display device. The external display device may be in proximity to the AR/MR display device and may be visible to the user of the AR/MR display device. Compatibility may include adjusting the brightness and/or the color of the virtual content so that it matches or is otherwise consistent with the brightness or color properties of the externally displayed content.

In an example, a user may have a head-mounted display equipped with a forward-facing camera and a "see-through" AR/MR display. The AR/MR display allows the user to see the surrounding environment, including any nearby external display devices. The following steps may be used to determine properties of the content being shown on the external display and to adjust the appearance of other content (e.g. virtual content, including augmentations or realistically rendered objects) to be displayed in the AR/MR display for compatibility with the user's view of the externally displayed content.

Using the forward-facing camera, images of the nearby environment are captured.

The captured images are analyzed to detect a nearby external display. This can be done using various computer vision techniques for object recognition, such as those described in Nacenta, cited above. Such techniques may be used to identify the presence of the external display device and to provide a location and extent (or "footprint") of the external display device within the captured image.

The extent of the content displayed on the external display device is identified. For example, this can be done by starting with the footprint of the external display device obtained from the previous step, and removing from consideration the frame or bezel of the external display device, so that only the active screen area of the external display is considered in subsequent steps. In some embodiments, the captured images may be compared across time to determine what rectangular area within the footprint of the external display device is changing over time, and this area may be identified as the active screen area to be considered in subsequent steps.

The captured samples within the extent of the content displayed on the external display device (e.g. within the active screen area) may be analyzed to determine visual properties of the externally displayed content. For example, a luminance histogram of these samples may be created to determine luminance properties such as minimum, maximum, and average luminance. Likewise, the color properties of these samples may be analyzed to determine color properties of the content as displayed by the external display device. Such analyses may be done for a single captured frame or may be computed over a time interval in which multiple (or many) captured frames are used as input.

The properties of the externally displayed content may be used to determine modifications to the other content (e.g. virtual content, including augmentations or realistically rendered objects) to be displayed in the AR/MR display. The modifications may be determined to make the other content compatible with the user's view of the externally displayed content. For example, the brightness or color properties of the other content may be adjusted so that the user sees the same or similar brightness and color properties between the user's view of the externally displayed content and the other content displayed in the AR/MR display. The modifications may take the form of brightness or color adjustments to be made to the other content to be displayed in the AR/MR display.

In some embodiments, the AR/MR HMD user may encounter the external display which is already displaying the externally displayed content. The detection of the external display may trigger additional steps to determine and adjust the brightness and/or color properties of the other content (e.g. virtual content, augmentations, and/or realistically rendered objects) to be displayed in the AR/MR HMD. The other content may be companion content produced for use with the externally displayed content. For example, if the externally displayed content is a football game, the other content to be displayed in the AR/MR display may be scores, statistics, and commentary about the football game. As another example, if the externally displayed content is a movie, then the other content may be a virtual rendering of one of the characters in the movie who appears next to the screen and makes comments about the movie. In the case of companion content, some embodiments may operate to identify the content currently playing on the external display so that the corresponding other content (e.g. virtual content, augmentations, and/or realistically rendered objects) may be generated, retrieved from a network, or otherwise obtained and then modified or adjusted according to the above steps before being displayed on the AR/MR display device.

In some embodiments, the AR/MR HMD user may encounter the external display, but the externally displayed content may not be already playing on the external display. Instead, the detection of the external display device (either visually or via a network connection and device discovery process, e.g. via UPnP) may cause the AR/MR device or an associated controller device to instruct the external display device to begin playing content selected by the AR/MR device. For example, the AR/MR device may have access to virtual content to be displayed as a companion presentation for a given movie, and the AR/MR device may (after detecting the presence of the external display device in the environment) request the external display device to begin playing the movie, so that the AR/MR device may then augment the movie viewing experience by displaying the companion content. In this case, the AR/MR device or the associated controller device does not need to identify what content is playing on the external device. The AR/MR device or the associated controller device may operate to identify the location and extent (e.g. "footprint") of the external display device in the user's view and may verify visually that the expected content is playing on the detected external display device, in case there are multiple external display devices in the environment. The AR/MR HMD or associated controller device may operate to adjust the brightness and/or color properties of the companion content (which may be virtual content, annotations, and/or realistically rendered objects) for compatibility with the externally displayed content as seen by the AR/MR HMD user.

In some embodiments, the other content to be displayed in the AR/MR HMD may not be companion content and may not have been prepared specifically for use with the externally displayed content. For example, the brightness and/or color properties of UI elements and annotations normally displayed in the AR/MR HMD may be adjusted for compatibility with the determined brightness and/or color properties of the externally displayed content. In some embodiments, this is done to ensure that the UI elements and annotations displayed in the AR/MR HMD are still visible in the presence of a potentially bright external display image.

Figure 13:
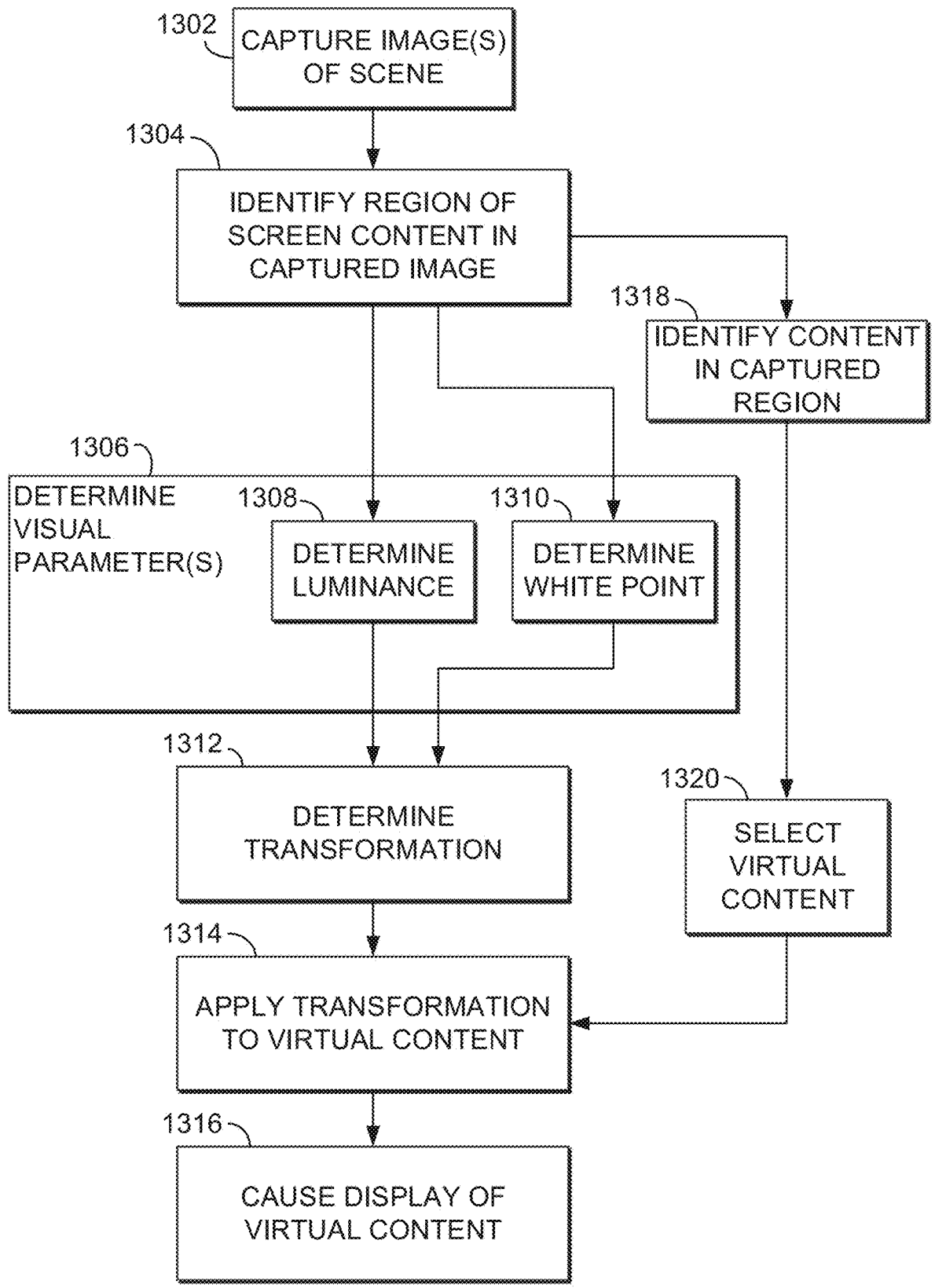
FIG. 13 is a flow diagram of a method of adjusting the appearance of virtual content according to some embodiments.

An example embodiment is illustrated in FIG. 13. A client device (e.g. an HMD and/or a controller associated with an HMD) captures at least one image of a real-world scene (1302). The client device identifies, in the image or images, a captured region of screen content (1304) displayed on an external display, such as a computer monitor, a television, or a movie screen. The client device determines (1306) at least one visual parameter of the screen content from the captured region of screen content. For example, the client device may determine a luminance (1308), which may be a maximum luminance. The client device may determine a white point (1310) of the screen content, which may be performed using a grey world algorithm. In some embodiments, the client device may determine more than one visual parameter. The client device determines a transformation (1312) based on the determined visual parameter(s). In some embodiments, where the visual parameter includes a luminance of the screen content, the transformation includes a transformation of brightness of the virtual content. The transformation of brightness may a gain factor applied to color code values of the virtual content. The gain factor may increase for increased determined luminance of the captured region of screen content. In some embodiments, where the visual parameter includes a white point of the screen content, the transformation may include a transformation of a white point of the virtual content. In some embodiments, an offset is applied in addition to the gain factor.

The client device applies the determined transformation or transformations to the virtual content (1314), and the client device causes display (1316) of the transformed virtual content on an augmented reality display. To cause display of the transformed virtual content, the client device may display the transformed virtual content if the client device is itself equipped with an augmented reality display device such as an HMD. If the client device is a controller for an associated display device, the client device may cause display of the transformed virtual content by transmitting a signal representing the transformed virtual content to the associated augmented reality display device.

In some embodiments, the virtual content is selected based on content being displayed by the external display. In an example of one such embodiment, the client device identifies (1318) the content being displayed in the captured region of screen content and selects (1320) the virtual content to be displayed based on the identified content.

Adjusting Virtual Content Based on Properties of the Identified External Display Device.

In some embodiments, an augmented reality or mixed reality (AR/MR) display is used to modify, adjust or enhance virtual content to be displayed in the AR/MR display for compatibility with content displayed on an external display device. The external display device may be in proximity to the AR/MR display device, and may be visible to the user of the AR/MR display device. Compatibility may include adjusting the brightness and/or the color of the virtual content so that it matches or is otherwise consistent with the brightness or color properties of the externally displayed content.

In an example, a user may have a head-mounted display equipped with a forward-facing camera and a "see-through" AR/MR display. The AR/MR display allows the user to see the surrounding environment, including any nearby external display devices. The following steps may be used to determine properties of the external display and to use such determined properties to adjust the appearance of other content (e.g. virtual content, including augmentations or realistically rendered objects) to be displayed in the AR/MR display. The other content may be adjusted visually for compatibility with the user's view of the externally displayed content.

Using the forward-facing camera, images of the nearby environment are captured. The captured images are analyzed to detect a nearby external display. This can be done using various computer vision techniques for object recognition, such as those described in Nacenta, cited above. Such techniques may be used to identify the presence of the external display device, and to provide a location and extent (or footprint) of the external display device within the captured image.

Properties of the external display are determined which would affect the externally displayed content. The properties of the external display may be determined by identifying the make and model of the external display and retrieving properties corresponding to that make and model from a database. The database may be local to the AR/MR HMD device or its associated controller. Alternately the database may be accessible to the AR/MR HMD device or its associated controller via a network. The properties of the external display may alternately be determined by communicating with the external display (e.g. using point to point wireless communication, or by communicating with the display device over a network). The determined properties of the external display may include fixed properties of the external display (e.g. maximum achievable brightness, color primaries, color space). The determined properties of the external display may include variable properties which are not intrinsic to a make and model of display (e.g. current brightness or color settings, a current display 'preset' mode in use, or an indication of the age of the display device).

The determined display properties may be used to determine modifications to the other content (e.g. virtual content, including augmentations or realistically rendered objects) to be displayed in the AR/MR display. The modifications may be determined to make the other content compatible with the user's view of the externally displayed content. For example, the brightness or color properties of the other content may be adjusted so that the user sees the same or similar brightness and color properties between the user's view of the externally displayed content and the other content displayed in the AR/MR display. The modifications may take the form of brightness or color adjustments to be made to the other content to be displayed in the AR/MR display.

In some embodiments, the user of a client device that includes an AR/MR HMD may encounter an external display that is already displaying the externally displayed content. The detection of the external display may trigger the additional steps to determine and adjust the brightness and/or color properties of the other content (e.g. virtual content, augmentations, and/or realistically rendered objects) to be displayed in the AR/MR HMD. The other content may be companion content produced for use with the externally displayed content. For example, if the externally displayed content is a football game, the other content to be displayed in the AR/MR display may be scores, statistics, and commentary about the football game. As another example, if the externally displayed content is a movie, then the other content may be a virtual rendering of one of the characters in the movie who appears next to the screen and makes comments about the movie. In the case of companion content, there may be an additional step to identify the content currently playing on the external display so that the corresponding other content (e.g. virtual content, augmentations, and/or realistically rendered objects) may be generated, retrieved from a network, or otherwise obtained and then modified or adjusted according to the above steps before being displayed on the AR/MR display device.

In a further embodiment, the AR/MR HMD user may encounter the external display before the externally displayed content is playing on the external display. In such a case, the detection of the external display device (either optically as described above, or via a network connection and device discovery process, e.g. via UPnP) may cause the client device to instruct the external display device to begin playing content selected by the client device. For example, the client device may have access to virtual content to be displayed as a companion presentation for a given movie, and the client device may (after detecting the presence of the external display device in the environment) request that the external display device begin playing the movie, so that the client device may then augment the movie viewing experience by displaying the companion content. In this case, the client device does not need to identify what content is playing on the external device. The client device may operate to identify the location and extent (e.g. "footprint") of the external display device in the user's view, and it may verify visually that the expected content is playing on the detected external display device, in case there are multiple external display devices in the environment. The client device may then operate as described above to adjust the brightness and/or color properties of the companion content (which may be virtual content, annotations, and/or realistically rendered objects) for compatibility with the externally displayed content as seen by the AR/MR HMD user.

In a further alternative embodiment, the content to be displayed in the AR/MR HMD may not be companion content and may not have been prepared specifically for use with the externally displayed content. Nevertheless, in some such embodiments, the brightness and/or color properties of UI elements and annotations displayed in the AR/MR HMD may be adjusted for compatibility with the determined brightness and/or color properties of the externally displayed content. This may be done as a style point, or to ensure that the UI elements and annotations displayed in the AR/MR HMD are still visible in the presence of a potentially bright external display image.

Adjusting Virtual Content Using a Hybrid Approach.

In some embodiments, a client device associated with an AR/MR HMD may operate to adjust virtual content to match externally displayed content based both on an analysis of captured view of the externally displayed content and on properties of the identified external display device. This may be done by determining how to adjust the virtual content based on analyzing a captured camera view of the externally displayed content and by determining how to adjust the virtual content based on obtaining properties of the external display device, e.g. via a database lookup or via communication with the external display device.

In some embodiments, the client device may base its adjustment of virtual content on an analysis of a captured view of the externally displayed content when the HMD camera has a good view of the content displayed on the external display device. When the HMD camera does not have a good view of the content displayed on the external display device the client device may base its adjustment of virtual content on properties of the identified external display device. The latter condition may occur when the external display is not yet displaying the content (e.g. it is before the movie starts), or when the external display is displaying a portion of the content not suitable for visual analysis (for example, it is displaying opening credits which have only words of a single color displayed on a black background, so that a useful color analysis is not possible). The latter condition may also occur when the user has turned his head away from the external display screen, possibly momentarily.

Other techniques described herein may be used in combination. For example, a model of the external display may take as input some fixed properties of the identified external display device, but may also take properties determined from analysis of captured HMD front-facing camera images of the externally displayed content to improve the result.

Determination of a Brightness Adjustment.

A method as described below may be used to determine a brightness adjustment for the virtual content for display of such content in the AR/MR HMD.

In some embodiments, a brightness adjustment is determined by determining a gain applied to color code values of content to be displayed on an HMD. Given a display luminance $L_{Real}$ of an external display and a display luminance $L_{AR}$ of an augmented reality display, a color code value $X_{AR}$ displayed on the external display generates output luminance $Y_{real}$ as follows:

$$Y_{real} = L_{real} \cdot (X_{AR})^{\gamma}$$

and a color code value $\tilde{X}_{AR}$ displayed on the HMD generates output luminance $Y_{AR}$ as follows:

$$Y_{AR} = L_{AR} \cdot (\tilde{X}_{AR})^{\gamma}$$

For the color code values $X_{AR}$ and $\tilde{X}_{AR}$ to achieve the same output luminance, $Y_{real}$ is set equal to $Y_{AR}$, which gives $$\tilde{X}_{AR} = \left(\frac{L_{AR}}{L_{real}}\right)^{1/\gamma} \cdot X_{AR}$$

which may be expressed as $$\tilde{X}_{AR} = \text{Gain}_{CodeValue} \cdot X_{AR}$$

with $$\text{Gain}_{CodeValue} = \left(\frac{L_{AR}}{L_{real}}\right)^{1/\gamma}$$

Thus, in some embodiments, to adjust the brightness of content displayed on the HMD for consistency with content displayed on an external display, a color code value $X_{AR}$ of content (e.g. a pixel of content) to be displayed on an HMD is multiplied by $\text{Gain}_{CodeValue}$. In some embodiments, the value of $\text{Gain}_{CodeValue}$ may be limited to avoid exceeding the parameters of the display. For example, in an embodiment in which the maximum displayable color code value is 255, the gain may be selected as follows $$\text{Gain}_{CodeValue} = \min\left(\frac{255}{CodeValuePeak}, \left(\frac{L_{AR}}{L_{real}}\right)^{1/\gamma}\right)$$

where CodeValuePeak is a peak value of $X_{AR}$ to be displayed in the virtual content.

Alternative embodiments may use other techniques to determine a gain value, or other techniques may be used to adjust the brightness of the content displayed on the HMD. For example, the formulas given above assume the same value of gamma, but alternative techniques may be applied if the gamma values are different.

An example brightening algorithm that may be used in some embodiments is described in Xu, Xinyu, and Louis Kerofsky. "Improving content visibility for high-ambient-illumination viewable display and energy-saving display." Journal of the Society for Information Display 19.9 (2011): 645-654.

In some embodiments, the luminance $L_{real}$ of the external display is determined by a method that includes capturing an image that includes the display, determining a region within the image that corresponds to content displayed on the display, and determining a maximum luminance value from within the determined region. The determined maximum luminance value may serve as a lower bound on the maximum luminance of the real-world display.

Determination of a Color Adjustment.

In some embodiments described herein, a color adjustment is applied to virtual content for display of such content in the AR/MR HMD.

In some embodiments, to perform a color adjustment, the gray world algorithm is applied to an image of the external display captured by the AR/MR HMD to determine an estimate of the white point of the content displayed on the external display. Some embodiments use techniques as described in Ebner, Marc, "The Gray World Assumption," Color Constancy, Chichester, West Sussex: John Wiley & Sons, 2007. The virtual content may be modified to be displayed using the estimated white point of the content displayed on the external display. In some embodiments, the white point may be determined based on a time average over a number of frames. In some embodiments, the white point of the content displayed on the external display may be determined based on a measured color of a known object detected in the content, such as a color of a branded item such as a soda can. In some embodiments, the external display may communicate white point information to the client device. In some embodiments, the client device may send to the external display an instruction to display particular content, such as a test pattern that may then be used by the client device to measure color properties of the display. In some embodiments, the client device may query the external display to retrieve information on user-adjustable settings of the display, such as brightness, contrast, and the like.

White point modification of the virtual content may be performed using one or more techniques known in the art. For example, the virtual content may be converted to the linear light domain, and the linear pixel values may be modified using chromatic adaptation. Some embodiments employ techniques as described in one or more of the following publications: Ebner, Marc, "Color Constancy," Chichester, West Sussex: John Wiley & Sons, 2007; Johannes von Kries, Beitrag zur physiologie der gesichtsempfindung. Arch. Anat. Physiol, 2:505-524, 1878; King Man Lam, Metamerism and Colour Constancy, Ph. D. Thesis, University of Bradford, 1985; H. Helson, "Object-color changes from daylight to incandescent filament illumination," Ilium. Engng., 47:35-42, 1957; Graham D Finlayson and Sabine Susstrunk, "Performance of a chromatic adaptation transform based on spectral sharpening," In Color and Imaging Conference, volume 2000, pages 49-55, 2000; Changjun Li, M Ronnier Luo, Bryan Rigg, and Robert W G Hunt, "CMC 2000 chromatic adaptation transform: Cmccat2000," Color Research & Application, 27(1):49-58, 2002. The virtual content may then be converted from the linear light domain back to the non-linear RGB domain for display.

Overview of Adjustment of Virtual Content.

Various approaches may be employed to adjust virtual content for consistency with content displayed on an external display.

Some embodiments may employ luminance matching. Such embodiments may operate to estimate peak luminance of real-world display, e.g. using a histogram from one or more images of the real-world display. A brightening (or dimming) factor for the virtual display may be determined based on the determined peak luminance of the external display. Alternatively, brightening (or dimming) may be applied to the external display for consistency with displayed virtual content.

Some embodiments may employ white point matching. Such embodiments may operate to estimate a white point of content displayed on an external display, e.g. using a gray world assumption. A white point adjustment may be performed to alter virtual content so that content has modified white point. Alternatively, a white point adjustment may be applied to the external display for consistency with displayed virtual content.

Some embodiments operate to match both luminance and white point of virtual content to the augmented content using the techniques described above.

Additional Embodiments

In some embodiments, a method for visual adjustment of virtual content includes: detecting an external display device in proximity to an AR device; capturing an image of the external display device using a camera of the AR device; determining the extent of a display area associated with the external display device; obtaining a set of sample values from the image which fall within the extent of the display area within the image; analyzing the sample values to determine a property of the externally displayed content (e.g. white point or luminance); and adjusting the virtual content for display within the AR device based on the determined property.

In some embodiments, a method for visual adjustment of virtual content includes: capturing an image of the proximity of an AR display device; detecting an external display device in proximity to an AR device; determining the set of pixels in the image corresponding to display area associated with the external display device; obtaining a set of sample values from the image which fall within the extent of the display area within the image; analyzing the sample values to determine a property of the external display (e.g. white point or luminance); and adjusting the virtual content for display within the AR device based on the determined property.

In some embodiments, a method includes: capturing video of a real-world scene; detecting a region of screen content in the captured video; selectively applying a screen-content color transformation on the region of screen content to generate processed video; and displaying the processed video substantially in real time. Some such embodiments are performed on a video-see-through augmented reality display, such as a video-see-through head-mounted display. In some embodiments, the screen-content color transformation is not performed on regions of the video outside the detected region of screen content.

In some embodiments, determining the screen-content color transformation may include determining properties of a display on which the screen content is displayed. In some embodiments, determining properties of the display comprises receiving at least one communication from the display conveying properties of the display. In some embodiments, determining properties of the display comprises analyzing video in the detected region of screen content.

In some embodiments, determining the screen-content color transformation comprises determining lighting conditions of the real-world scene, such as determining a white point.

In some embodiments, a method for improving the rendering of images of a real-world display viewed on a second display includes: capturing an image of a real-world scene; estimating lighting of the real-world environment; detecting the presence and location of a real-world display in the real-world image; estimating the capability of the real-world display; determining enhancement properties corresponding to the real-world display based on the estimated capability and real-world lighting; computing an enhanced image by enhancing the real-world scene in the region containing the location of the real-world display based on the estimated capability and estimated lighting; and rendering the enhanced real-world image to a second display.

In some such embodiments, the capability of the real-world display comprises information about a brightness or color gamut of the display.

In some embodiments, the capability of the real-world display is received over a communication channel from the real-world display. In some embodiments, the capability of the real-world display is estimated by identification of the model of the real-world display and querying the internet (e.g. a database accessible via the internet) to determine the capability of the real-world display.

In some embodiments, estimating lighting of the real-world environment includes measuring an ambient light level. This may be done using the image of the real-world environment.

In some embodiments, content shown on the real-world display is coordinated with the content shown on the second display.

In some embodiments, a method includes: determining an angular size of an object to be displayed to a user; determining a color adjustment for the object based on the determined angular size; applying the color adjustment to the object; and rendering the color-adjusted object. The color-adjusted object may be rendered on, for example, a head-mounted display, a phone, or a tablet.

In some such embodiments, determining an angular size of the object comprises determining an on-screen size of the object and determining a distance of the user from the screen.

In some embodiments, a method is provided for improving the rendering of images of a real-world display viewed on a second display. An example method includes: capturing an image of a real-world scene; estimating lighting of the real-world environment; detecting the presence and location of a real-world display in the real-world image; estimating the capability of the real-world display; determining adjustment properties corresponding to the real-world display based on the estimated capability and real-world lighting; computing an adjusted image by adjusting the real-world scene in the region containing the location of the real-world display based on the estimated capability and estimated lighting; and rendering the adjusted real-world image to a second display. In some such embodiments, the capability of the real-world display is estimated by identification of the model of the real-world display and querying a database of capability of the real-world display based on the identified model.

In some embodiments, a system includes a processor and a non-transitory computer-readable medium storing instructions operative to perform any of the functions described herein.

Note that various hardware elements of one or more of the described embodiments are referred to as "modules" that carry out (i.e., perform, execute, and the like) various functions that are described herein in connection with the respective modules. As used herein, a module includes hardware (e.g., one or more processors, one or more microprocessors, one or more microcontrollers, one or more microchips, one or more application-specific integrated circuits (ASICs), one or more field programmable gate arrays (FPGAs), one or more memory devices) deemed suitable by those of skill in the relevant art for a given implementation. Each described module may also include instructions executable for carrying out the one or more functions described as being carried out by the respective module, and it is noted that those instructions could take the form of or include hardware (i.e., hardwired) instructions, firmware instructions, software instructions, and/or the like, and may be stored in any suitable non-transitory computer-readable medium or media, such as commonly referred to as RAM, ROM, etc.

Although features and elements are described above in particular combinations, one of ordinary skill in the art will appreciate that each feature or element can be used alone or in any combination with the other features and elements. In addition, the methods described herein may be implemented in a computer program, software, or firmware incorporated in a computer-readable medium for execution by a computer or processor. Examples of computer-readable storage media include, but are not limited to, a read only memory (ROM), a random access memory (RAM), a register, cache memory, semiconductor memory devices, magnetic media such as internal hard disks and removable disks, magneto-optical media, and optical media such as CD-ROM disks, and digital versatile disks (DVDs). A processor in association with software may be used to implement a radio frequency transceiver for use in a WTRU, UE, terminal, base station, RNC, or any host computer.

What is claimed:

1. A method comprising:
   capturing at least one image of a real-world scene;
   identifying, in the at least one image, a region of captured screen content;
   determining at least one visual parameter of the captured screen content;
   based on the at least one visual parameter, determining a transformation for the captured screen content;
   applying the transformation to the captured screen content; and
   causing display of the transformed captured screen content on an augmented reality display.

2. The method of claim 1, wherein the visual parameter of the captured screen content is determined based on samples within the captured screen content.

3. The method of claim 1, wherein determining at least one visual parameter of the captured screen content includes identifying a type of display used to display the captured screen content and retrieving the visual parameter based on the type of display.

4. The method of claim 1, wherein the visual parameter of the captured screen content is determined by communicating with a display used to display the captured screen content.

5. The method of claim 1, wherein the visual parameter is a brightness parameter, and wherein applying the transformation comprises adjusting a brightness of the captured screen content.

6. The method of claim 1, wherein the visual parameter is a color parameter, and wherein applying the transformation comprises adjusting a color of the captured screen content.

7. The method of claim 1, wherein the capturing of at least one image of the real-world scene is performed by a forward-facing camera of the augmented reality display.

8. The method of claim 1, wherein the augmented reality display is a video see-through display, and the transformed screen content is displayed as an overlay over the captured region of screen content.

9. The method of claim 1, further comprising displaying virtual content on the augmented reality display, wherein the determination of the transformation for the captured screen content is further based at least in part on the virtual content.

10. The method of claim 9, wherein the determination of the transformation for the captured screen content is performed to provide consistency between a brightness of the transformed captured screen content and a brightness of the virtual content.

11. The method of claim 9, wherein the determination of the transformation for the captured screen content is performed to provide consistency between a color of the transformed captured screen content and a color of the virtual content.

12. An apparatus comprising one or more processors configured to perform at least:
   capturing at least one image of a real-world scene;
   identifying, in the at least one image, a region of captured screen content;
   determining at least one visual parameter of the captured screen content;
   based on the at least one visual parameter, determining a transformation for the captured screen content;
   applying the transformation to the captured screen content; and
   causing display of the transformed captured screen content on an augmented reality display.

13. The apparatus of claim 12, wherein the visual parameter of the captured screen content is determined based on samples within the captured screen content.

14. The apparatus of claim 12, wherein determining at least one visual parameter of the captured screen content includes identifying a type of display used to display the captured screen content and retrieving the visual parameter based on the type of display.

15. The apparatus of claim 12, wherein the visual parameter of the captured screen content is determined by communicating with a display used to display the captured screen content.

16. The apparatus of claim 12, wherein the capturing of at least one image of the real-world scene is performed by a forward-facing camera of the augmented reality display.

17. The apparatus of claim 12, wherein the augmented reality display is a video see-through display, and the transformed screen content is displayed as an overlay over the captured region of screen content.

18. The apparatus of claim 12, further configured to display virtual content on the augmented reality display, wherein the determination of the transformation for the captured screen content is further based at least in part on the virtual content.

19. The apparatus of claim 18, wherein the determination of the transformation for the captured screen content is performed to provide consistency between a brightness of the transformed captured screen content and a brightness of the virtual content.

20. The apparatus of claim 18, wherein the determination of the transformation for the captured screen content is performed to provide consistency between a color of the transformed captured screen content and a color of the virtual content.

* * * * *